United States Patent
Shiraishi

(10) Patent No.: US 10,509,556 B2
(45) Date of Patent: Dec. 17, 2019

(54) DISPLAY DEVICE

(71) Applicant: KYOCERA Document Solutions Inc., Osaka (JP)

(72) Inventor: Takanori Shiraishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/943,138

(22) Filed: Apr. 2, 2018

(65) Prior Publication Data

US 2018/0321834 A1    Nov. 8, 2018

(30) Foreign Application Priority Data

May 2, 2017 (JP) ................. 2017-091935
May 2, 2017 (JP) ................. 2017-091937

(51) Int. Cl.

| G06F 3/048 | (2013.01) |
|---|---|
| G06T 3/40 | (2006.01) |
| G06T 19/00 | (2011.01) |
| G06T 19/20 | (2011.01) |
| G09G 5/00 | (2006.01) |
| G09G 5/36 | (2006.01) |
| G09G 5/10 | (2006.01) |
| G06F 3/0484 | (2013.01) |
| G06F 3/0488 | (2013.01) |

(52) U.S. Cl.
CPC ........ *G06F 3/04847* (2013.01); *G06F 3/0488* (2013.01); *G06T 3/40* (2013.01); *G06T 19/006* (2013.01)

(58) Field of Classification Search
CPC combination set(s) only.
See application file for complete search history.

(56) References Cited

U.S. PATENT DOCUMENTS

| 9,992,419 | B2 * | 6/2018 | Nielsen | H04N 5/2628 |
|---|---|---|---|---|
| 2008/0008361 | A1 * | 1/2008 | Nozaki | H04N 5/232 |
| | | | | 382/118 |
| 2015/0002701 | A1 * | 1/2015 | Mayuzumi | H04N 5/23229 |
| | | | | 348/239 |
| 2015/0070389 | A1 * | 3/2015 | Goto | G06T 7/00 |
| | | | | 345/633 |
| 2015/0123994 | A1 * | 5/2015 | Suzuki | G06F 3/011 |
| | | | | 345/629 |
| 2017/0323449 | A1 * | 11/2017 | Aonuma | G06T 19/006 |
| 2018/0212684 | A1 * | 7/2018 | Aoyama | G06F 1/1626 |

FOREIGN PATENT DOCUMENTS

JP    2016-36106 A    3/2016

\* cited by examiner

*Primary Examiner* — Wesner Sajous
(74) *Attorney, Agent, or Firm* — Stein IP, LLC

(57) ABSTRACT

A display device has an image shooting unit, a display unit, an operation portion, and a processing unit. The processing unit recognizes a particular segment included in a shot image. The processing unit makes the display unit display an added image indicating the particular segment in a form superimposed on the shot image. The processing unit changes the display as to the added image according to operations on the operation portion.

19 Claims, 19 Drawing Sheets ations Nos. 2017-091935 and 2017-91937 both filed on May
DISPLAY DEVICE

INCORPORATION BY REFERENCE

This application is based upon and claims the benefit of priority from the corresponding Japanese Patent Applications Nos. 2017-091935 and 2017-91937 both filed on May 2, 2017, the entire contents of which are incorporated herein by reference.

BACKGROUND

The present disclosure relates to a display device that displays a shot image obtained through shooting (with a camera) with another image superimposed on it.

A real image (really shot image) is often displayed with an electronic image superimposed on it. This technology is often termed as augmented reality (AR). One known information processing device employing augmented reality is configured as follows.

Specifically, in the disclosed information processing device, an object in a shot image that is being displayed is recognized; related information related to the object is extracted; the related information is displayed in a form superimposed on the shot image; whether or not the recognized object keeps being recognized is monitored; when the object ceases to be recognized, according to the progress of superimposed display processing, the superimposed display processing is either continued or stopped. Stable superimposed display is thus attempted in an augmented reality display system employing a device that changes its location unstably.

In augmented reality display, a really shot image is displayed. In a form superimposed on the shot image, an AR image (additional information for AR display) is displayed. The AR image is, for example, information for aiding the user's understanding. For example, some users prefer large AR images, while other users prefer small AR images. Conventionally, AR images cannot be changed as the user desires (prefers), which is a disadvantage. The known device mentioned above, making no mention of displaying AR image as the user desires, gives no solution to the just-mentioned disadvantage.

SUMMARY

According to the present disclosure, a display device includes an image shooting unit, a display unit, an operation portion, and a processing unit. The display unit displays a shot image obtained through the shooting by the image shooting unit. The operation portion accepts an operations by a user. The processing unit recognizes the operation based on the output of the operation portion. The processing unit controls display on the display unit. The processing unit recognizes a particular segment included in the shot image. The processing unit makes the display unit display an added image indicating the particular segment in a form superimposed on the shot image. The processing unit changes the display related to the added image according to the operation on the operation portion.

Further features and advantages of the present disclosure will become apparent from the description of embodiments given below.

DETAILED DESCRIPTION

The present disclosure allows an image superimposed on a shot image to be changed as a user desires, and allows comfortable display of augmented reality. The present disclosure also allows a particular AR image to be marked with a token. The present disclosure further allows fixed display of an image marked with a token.

Hereinafter, with reference to FIGS. 1 to 25, an embodiment of the present disclosure will be described. In the following description, a portable display device 1 will be described. It should however be noted that the features specifically described below in terms of configuration, arrangement, etc. in connection with the embodiment are all merely illustrative and are not meant to limit the scope of the disclosure.

(Display Device 1)

Figure 1:
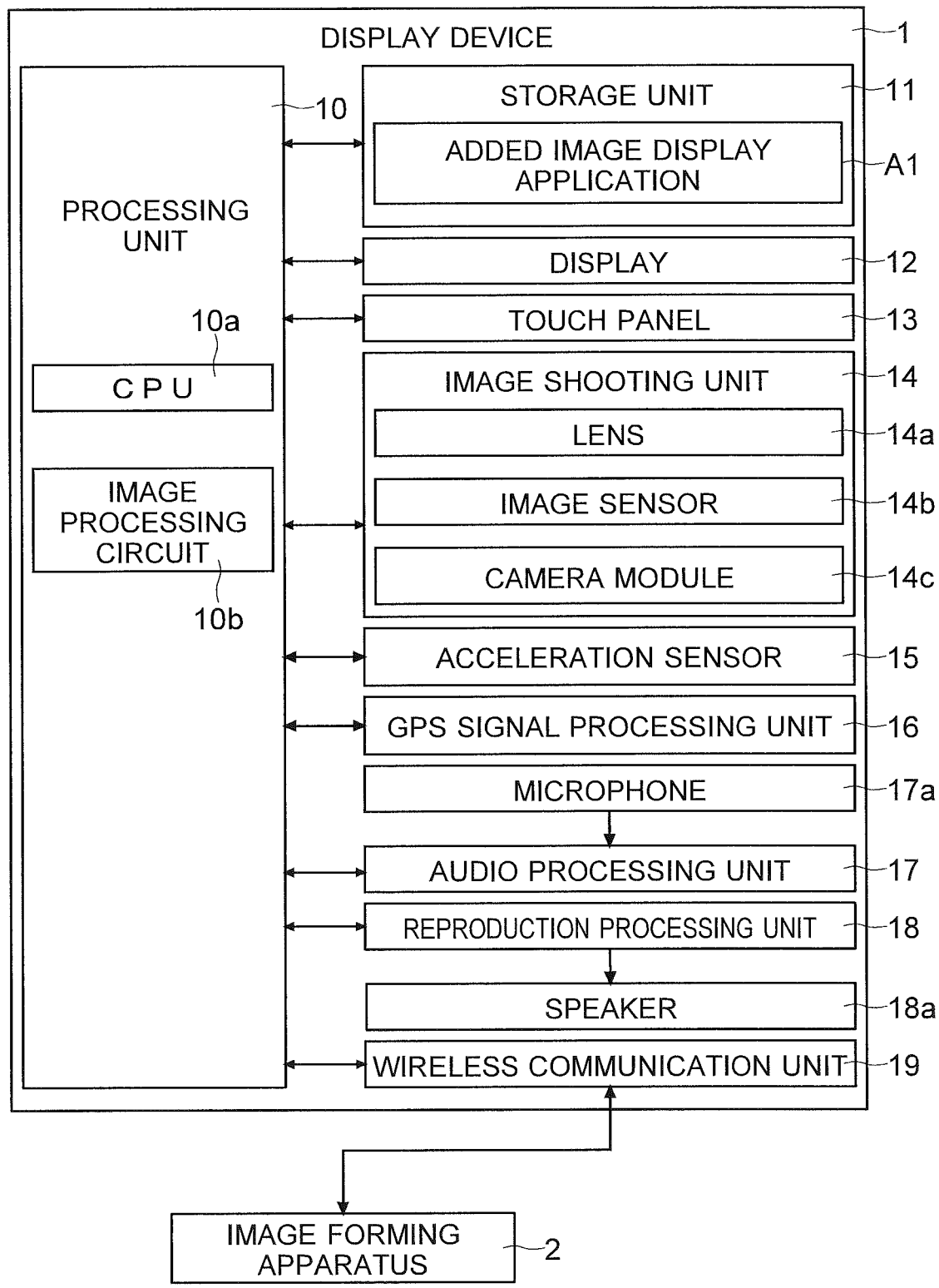
FIG. 1 is a diagram showing one example of a display device according to an embodiment.

With reference to FIG. 1, one example of a display device 1 according to the embodiment will be described. In the following description, an example where a smartphone is used as the display device 1 will be described. The display device 1, however, is not limited to a smartphone. The display device 1 may instead be a tablet computer. The display device 1 may instead be a head-mounted display. In the following description, the display device 1 is one that is portable and that can display augmented reality (AR). The display device 1 performs AR display with respect to an image forming apparatus 2. Accordingly, the present disclosure has an aspect as a display system that includes a display device 1 and an image forming apparatus 2.

The display device 1 includes a processing unit 10, a storage unit 11, a display 12 (corresponding to a display unit), a touch panel 13 (corresponding to an operation portion), an image shooting unit 14, an acceleration sensor 15 (corresponding to a reset detection unit), a GPS signal processing unit 16 (corresponding to a location sensing unit), an audio processing unit 17, a microphone 17a, a reproduction processing unit 18, a speaker 18a, and a wireless communication unit 19.

The processing unit 10 is a circuit which controls the operation of the display device 1. The processing unit 10 includes a CPU 10a and an image processing circuit 10b. As the processing unit 10, an integrated circuit that has the CPU 10a and the image processing circuit 10b integrated into one chip can be used. The processing unit 10 controls the operation of the display device 1 according to an OS, programs, applications, and data. The image processing circuit 10b performs image processing on image data.

The storage unit 11 includes ROM, RAM, and flash memory. The storage unit 11 stores the OS, programs, applications, and data for the display device 1 on a non-volatile basis. The processing unit 10 controls individual blocks in the display device 1 according to what is stored in the storage unit 11. In response to a request to start up an application from the user via the touch panel 13, the processing unit 10 reads the application out of the storage unit 11 and executes it. The storage unit 11 contains an added image display application A1. Based on the added image display application A1, the processing unit 10 makes the display 12 perform AR display with respect to the image forming apparatus 2.

The display 12 displays various kinds of information according to requests from the processing unit 10. The display 12 is a display panel such as a liquid crystal panel or an organic EL panel. The display 12 displays operation images. Operation images include, for example, icons, buttons, keys, and tabs. The touch panel 13 is connected to the processing unit 10. Based on the output of the touch panel 13, the processing unit 10 recognizes a touch position and an operated (touched) operation image. By pressing an icon, button, or key, the user can start up and use an application.

The image shooting unit 14 is a camera provided in the display device 1. The image shooting unit 14 includes a lens 14a, an image sensor 14b, and a camera module 14c. The camera module 14c generates image data based on an image signal output from the image sensor 14b. A shot image 3 (image data) obtained through the shooting by the image shooting unit 14 is stored in the storage unit 11. The processing unit 10 can make the display 12 display the shot image 3. For display in a movie-like manner, the processing unit 10 make the image shooting unit 14 generate shot images successively. The processing unit 10 switches the shot image 3 used for display sequentially to the newly generated shot image 3.

The wireless communication unit 19 includes an antenna and a communication circuit. According to instructions from the processing unit 10, the wireless communication unit 19 can access a communication network provided by a telecommunications carrier. Via the wireless communication unit 19, exchange of data with the outside and speech communication with the other end are possible. The wireless communication unit 19 can also communicate with the image forming apparatus 2 wirelessly.

The audio processing unit 17 performs signal processing to convert the sound input via the microphone 17a into data that can be transmitted from the wireless communication unit 19. The reproduction processing unit 18 makes the speaker 18a reproduce the data of sound (voice) received by the wireless communication unit 19 from the other end. The reproduction processing unit 18 can also make the speaker 18a reproduce the data of sound stored in the storage unit 11.

The acceleration sensor 15 includes a sensing device portion for sensing acceleration. As the acceleration sensor 15, any of various devices such as a capacitance type, a piezoresistive type, and a gas temperature distribution type can be used. The sensing device portion outputs a voltage commensurate with the deformation (strain) that develops under the action of acceleration. As the acceleration sensor 15, one involving two or more axes is used. The acceleration sensor 15 includes a processing circuit for processing the output of the sensing device portion. So that the movement direction of the display device 1 can be recognized, the processing circuit processes the output of the sensing device portion, and outputs a voltage waveform that is proportional to the acceleration and that in addition reflects the movement direction. Based on the output of the acceleration sensor 15, the processing unit 10 recognizes the movement direction and the acceleration.

Based on GPS signals from satellites, the GPS signal processing unit 16 senses the current location of the display device 1. The GPS signal processing unit 16 includes a signal processing circuit, a memory, and an antenna. The memory stores data and programs related to location sensing based on GPS signals. The antenna receives GPS signals transmitted from a plurality of artificial satellites respectively. Based on GPS signals transmitted from different artificial satellites, the signal processing circuit identifies through calculation the current location of the display device 1. The processing unit 10 obtains from the GPS signal processing unit 16 information indicating the current location (coordinates) of the display device 1.

(Image Forming Apparatus 2)

Figure 2:
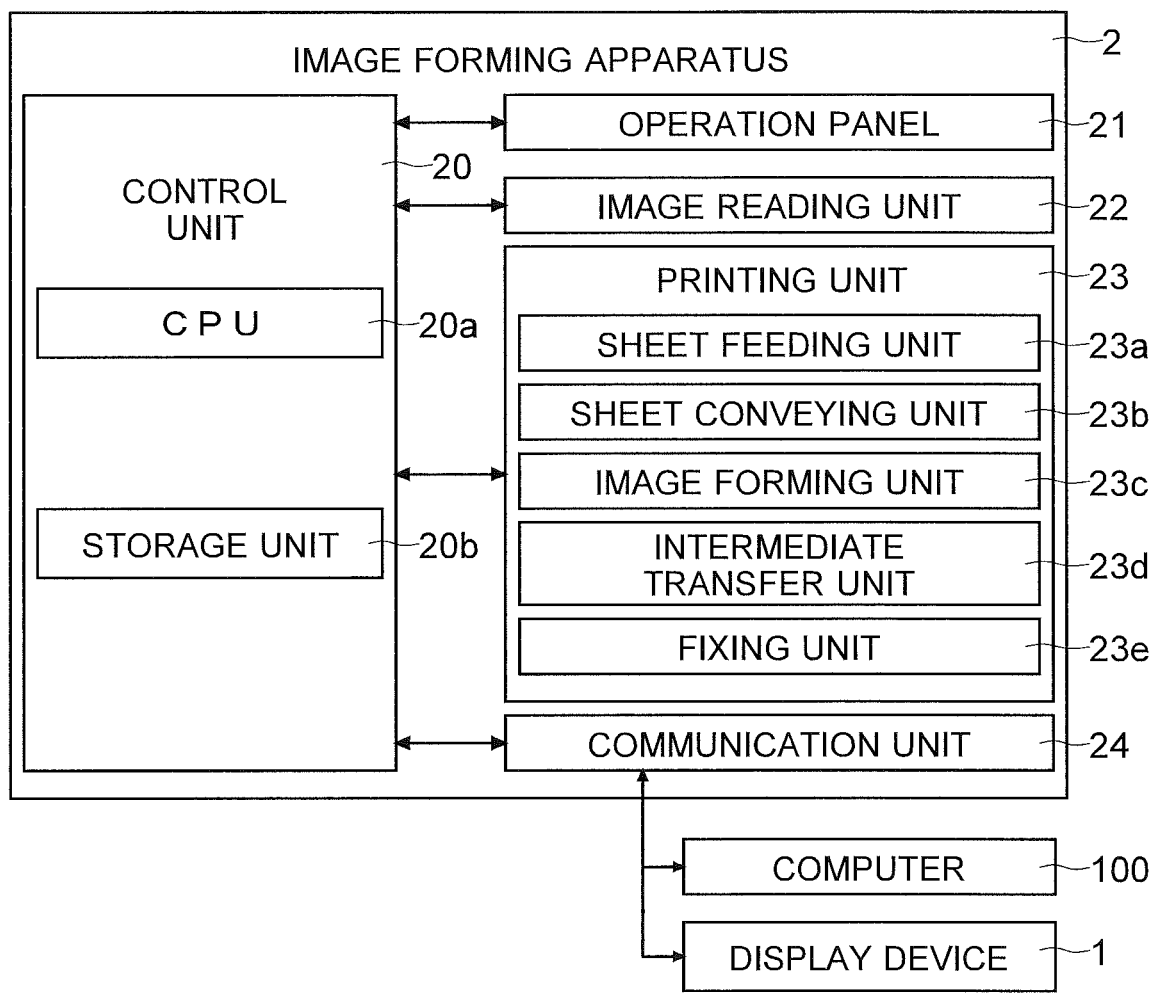
FIG. 2 is a diagram showing one example of an image forming apparatus according to the embodiment.

With reference to FIG. 2, one example of the image forming apparatus 2 according to the embodiment will be described. The image forming apparatus 2 shown in FIG. 2 is a multifunction peripheral. The image forming apparatus 2 may instead be any other image forming apparatus 2 such as a printer or a copier. The image forming apparatus 2 includes a control unit 20, an operation panel 21, an image reading unit 22, a printing unit 23, and a communication unit 24.

The control unit 20 controls the operation of the image forming apparatus 2. The control unit 20 includes a CPU 20a and a storage unit 20b. The storage unit 20b stores data, settings, and programs for controlling the image forming apparatus 2. The CPU 20a controls the image forming apparatus 2 based on the programs and data stored in the storage unit 20b.

During a job (copying or transmission) that involves reading a document, the control unit 20 makes the image reading unit 22 read the document. The image reading unit 22 generates the image data of the document. The operation panel 21 accepts setting operation by the user. The control unit 20 communicates with the operation panel 21 to recognize settings. Based on the user's settings, the control unit 20 make the image reading unit 22, the printing unit 23, and the communication unit 24 operate.

The printing unit 23 includes, for example, a sheet feeding unit 23a, a sheet conveying unit 23b, an image forming unit 23c, an intermediate transfer unit 23d, and a fixing unit 23e. During a job involving printing, the control unit 20 makes the printing unit 23 perform printing based on image data. The communication unit 24 can communicate with the wireless communication unit 19 wirelessly. The communication unit 24 can also communicate with a computer 100 via a network. The communication unit 24 receives printing data transmitted from the display device 1 or the computer 100. Based on the received printing data, the control unit 20 makes the printing unit 23 perform printing.

(Flow of AR Display as to the Image Forming Apparatus 2)

Figure 3:
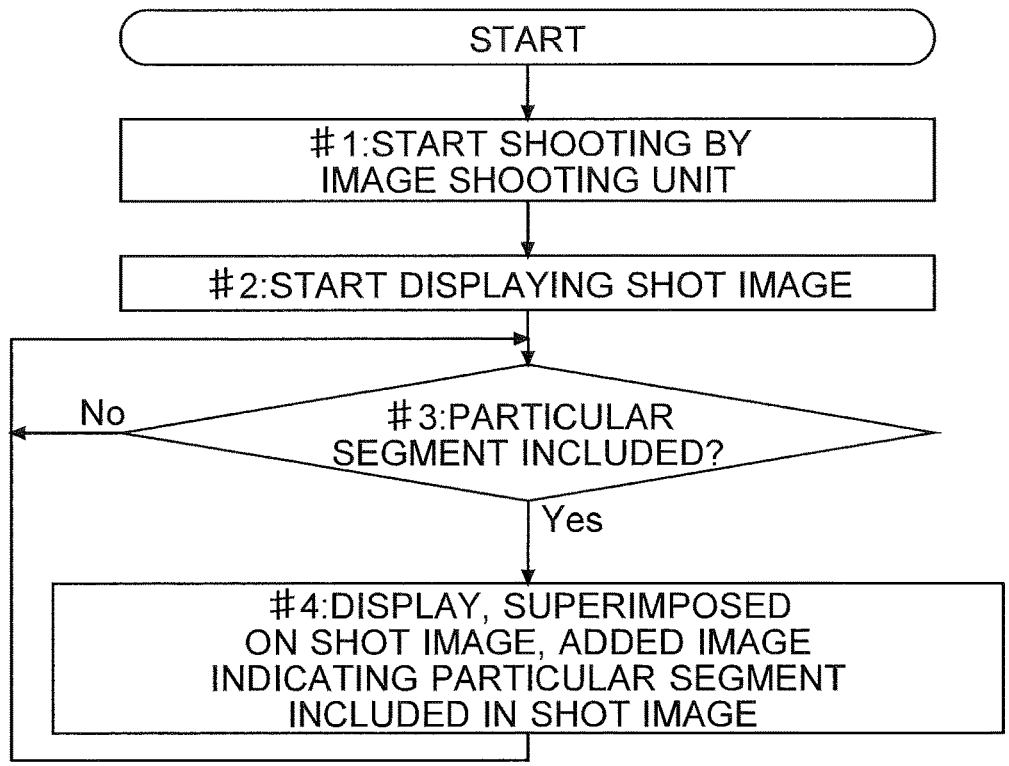
FIG. 3 is a flow chart showing one example of a flow of AR display in the display device according to the embodiment.
Figure 4:
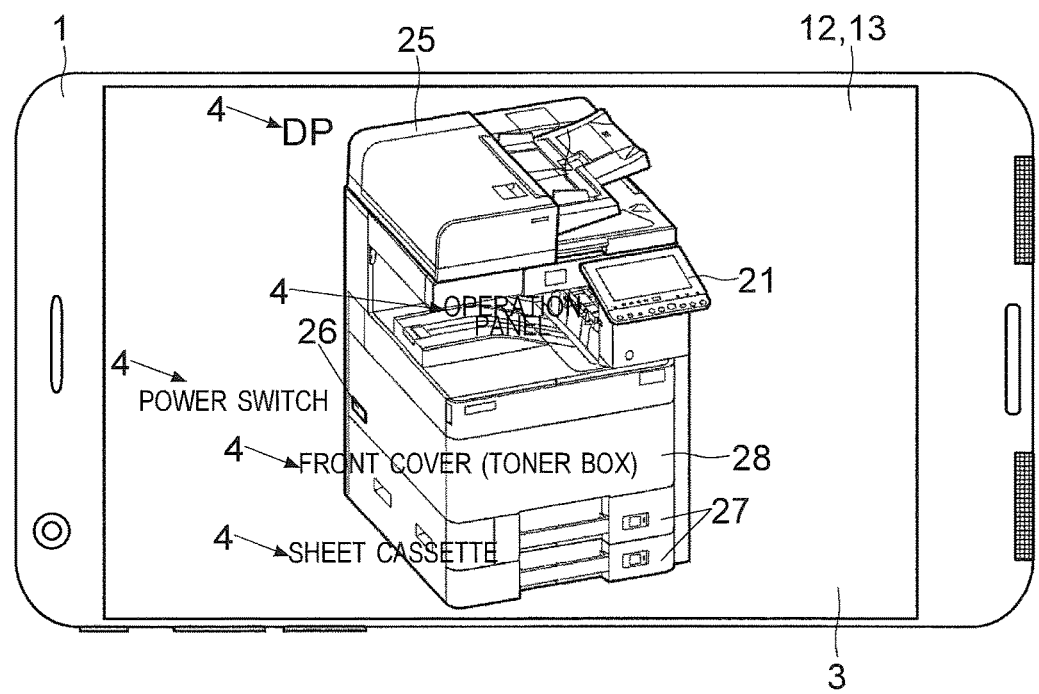
FIG. 4 is a diagram showing one example of AR display in the display device according to the embodiment.

With reference to FIGS. 3 and 4, one example of AR display in the display device 1 with respect to the image forming apparatus 2 according to the embodiment will be described. The display device 1 displays an added image 4 (AR image) as to the image forming apparatus 2. By starting up the added image display application A1, it is possible to start the display of the added image 4. In FIG. 3, START marks the time point at which the added image display application A1 is started. The flow continues so long as the added image display application A1 remains selected. When the added image display application A1 ends, the flow ends.

The processing unit 10 makes the image shooting unit 14 start shooting (step #1). Thus, the image shooting unit 14 starts to operate. The processing unit 10 makes the image shooting unit 14 generate shot images 3 at previously determined periods (intervals). The processing unit 10 makes the image shooting unit 14 generate shot images 3 of a previously determined number of pixels. The generated shot images 3 are stored in the storage unit 11.

Subsequently, the processing unit 10 makes the display 12 start to display the shot images 3 (step #2). When a new shot image 3 is generated, the processing unit 10 switches the shot image used for display to the new one. For example, the processing unit 10 makes the display 12 display the newest shot image 3. Thus, the shot images 3 are displayed on the display 12 in a movie-like manner. The shooting range, direction, and angle of the image shooting unit 14 are linked with the image displayed on the display 12.

Next, the processing unit 10 checks whether or not the shot image 3 includes a particular segment (step #3). A particular segment is a previously determined part of the image forming apparatus 2. In other words, a particular segment is a part of the image forming apparatus 2. As shown in FIG. 4, for example, a DP, a power switch 26, a sheet cassette 27, a front cover 28 (toner box), and an operation panel 21 can be taken as particular segments.

The DP is a part of the image reading unit 22. The DP is a document conveying device 25. The DP is a device which conveys the set document one sheet after another to a reading position. The power switch 26 is a switch for turning on the main power. The sheet cassette 27 is a part of the sheet feeding unit 23a. The sheet cassette 27 can be pulled out. In the sheet cassette 27, sheets are set. Inside the front cover 28, a toner box for storing toner to be fed to the image forming unit 23c is housed. In this way, any part that the user operates (or touches during maintenance) can be taken as a particular segment.

To enable recognition of particular segments, each particular segment is previously marked with an AR marker. An AR marker is a geometrical figure with a predetermined pattern. Marking with AR markers can be achieved in any manner as by affixing labels, painting, or printing. The patterns of AR markers differ from one particular segment to another. Based on an AR marker included in the shot image 3, the processing unit 10 recognizes a particular segment included in the shot image 3. When a plurality of AR markers are included in the shot image 3, the processing unit 10 finds that a plurality of particular segments are included in the shot image 3. When no AR marker is included in the shot image 3, the processing unit 10 finds that no particular segment is included in the shot image 3.

The processing unit 10 may instead analyze the shot image 3 to recognize a particular segment included in the shot image 3. For example, particular segment identification data (unillustrated) is stored in the storage unit 11. In the particular segment identification data, the colors, shapes, and the like of particular segments are defined. In this case, the processing unit 10 refers to the particular segment identification data and the shot image 3. On the basis of the colors of individual pixels and the shapes of areas of different colors in the shot image 3, the processing unit 10 recognizes particular segments included in the shot image 3.

When it is found that no particular segment is included (step #3, No), the flow returns to step #3. The processing unit 10 continues to check whether or not a particular segment is included in the shot image 3. On the other hand, when it is found that a particular segment is included in the shot image 3 (step #3, Yes), the processing unit 10 has the shot image 3 displayed in a form superimposed with an added image 4 indicating the particular segment included in the shot image 3 (step #4). The flow then returns to step #3.

FIG. 4 shows one example of the display device 1 as it is when shooting the image forming apparatus 2 from obliquely above. FIG. 4 together shows one example of the shot image 3 having added images 4 superimposed on it. Images used as added images 4 are determined as appropriate. In the current description, it is assumed that, as shown in FIG. 4, added images 4 include character strings. The character strings included in added images 4 are the names of particular segments. In the current description, it is assumed that an added image 4 is an image of a borderless transparent rectangular box containing a character string. The default color of the characters in added images 4 is black. The default (initial) size of the characters in added images 4 is previously determined. An image of a borderless white rectangular box containing a character string may instead be used as an added image 4. An image of a bordered rectangular box containing a character string may instead be used as an added image 4.

The processing unit 10 makes the display 12 display an added image 4 near the particular segment to which it corresponds. The default display position of added images 4 is previously determined. For example, the processing unit 10 makes the display panel display an added image 4 corresponding to a particular segment at one of the left, right, top, and bottom sides of an AR marker. FIG. 4 shows an example where added images 4 are displayed on the left side of particular segments. At which position to display added images 4 may be determined separately for different particular segments.

(Enlarging and Reducing an Added Image)

Figure 5:
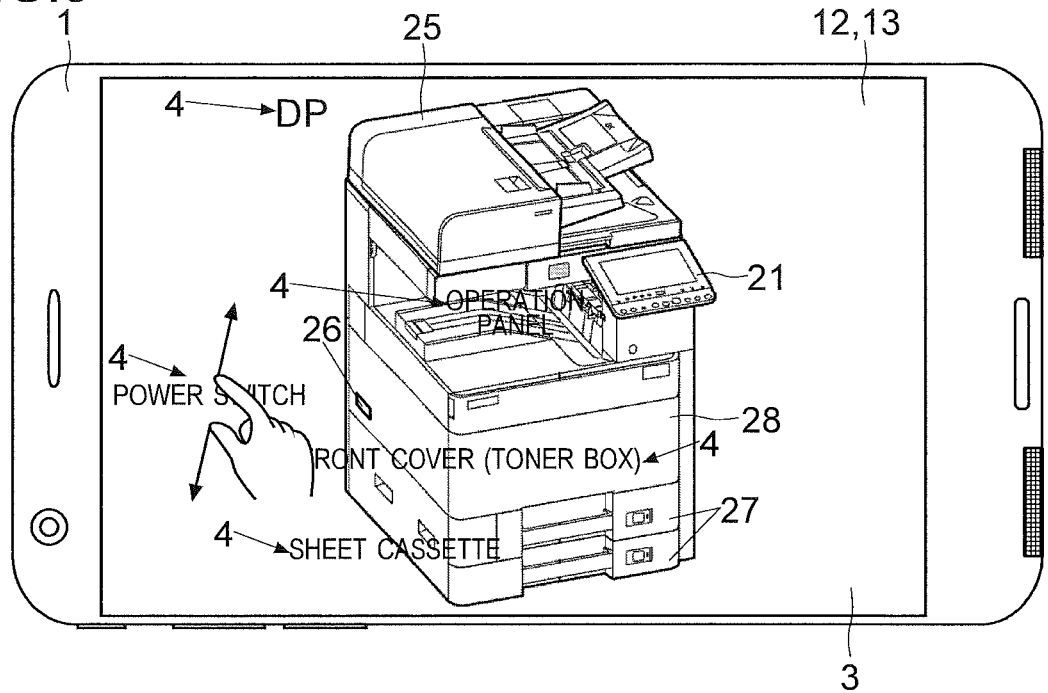
FIG. 5 is a diagram showing one example of enlargement of an added image according to the embodiment.
Figure 5:
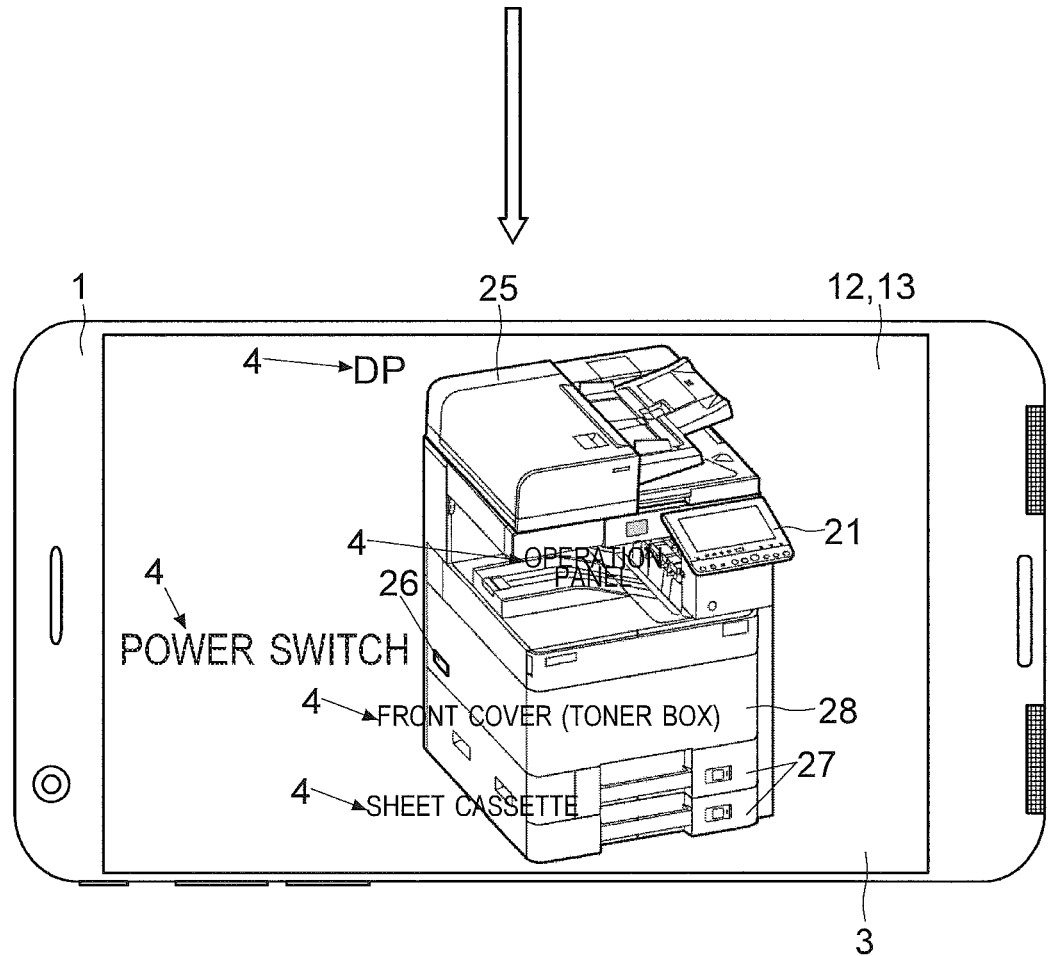

Next, with reference to FIGS. 5 and 6, one example of enlarging and reducing an added image 4 according to the embodiment will be described. When a particular segment is shot, the processing unit 10 makes the display 12 start to display an added image 4. Whether the displayed added image 4 is perceived as small or large varies from one user to another. An added image 4 in an inadequate size can be perceived to be difficult to see by the user. In the display device 1 according to the embodiment, a configuration is adopted such that an added image 4 can be enlarged and reduced. FIG. 5 shows one example of enlarging an added image 4. Based on the output of the touch panel 13, the processing unit 10 recognizes that an enlarging operation is performed. When an enlarging operation is performed, the processing unit 10 makes the added image 4 on which the enlarging operation is performed larger than before the enlarging operation. This eliminates the difficulty seeing.

What operation to handle as an enlarging operation can be determined as appropriate. The touch panel 13 accepts as an enlarging operation an operation of making a two-point touch and then spreading the fingers apart (pinch-out operation). A condition is that, of the two touch start positions, at least one overlap the added image 4. After the two-point touch, when the distance between the touch positions increases, the processing unit 10 recognizes that an enlarging operation is performed. The upper section of FIG. 5 shows one example of the enlarging operation. The lower section of FIG. 5 shows one example of the added image 4 for the power switch 26 after enlargement.

The processing unit 10 enlarges the added image 4 (character string) on which the enlarging operation is performed (which is touched at the start of the two-point touch). The processing unit 10 may enlarge the added image 4 at a previously determined magnification. In this case, by repeating the enlarging operation, it is possible to make the added image 4 increasingly large stepwise. The processing unit 10 may instead vary the magnification according to the distance between the two-point touch positions. For example, based on the output of the touch panel 13, the processing unit 10 calculates the difference between the distance at the end of the two-point touch and the distance at the start of the two-point touch. The larger the difference in distance, the higher the processing unit 10 can make the magnification; the smaller the difference in distance, the lower the processing unit 10 can make the magnification.

Figure 6:
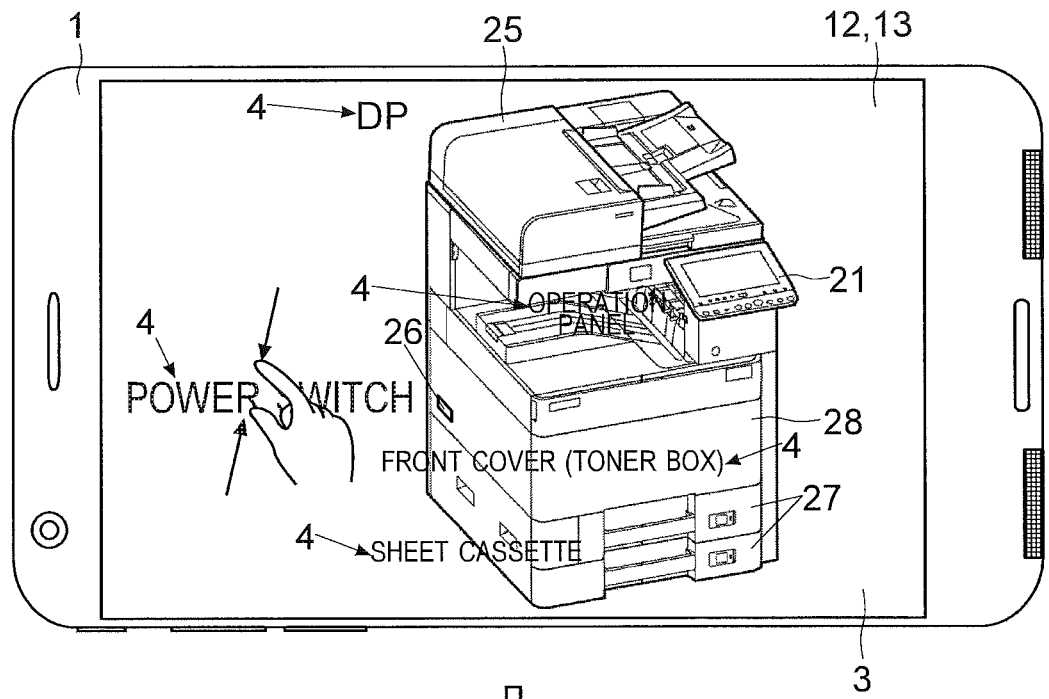
FIG. 6 is a diagram showing one example of reduction of an added image according to the embodiment.
Figure 6:
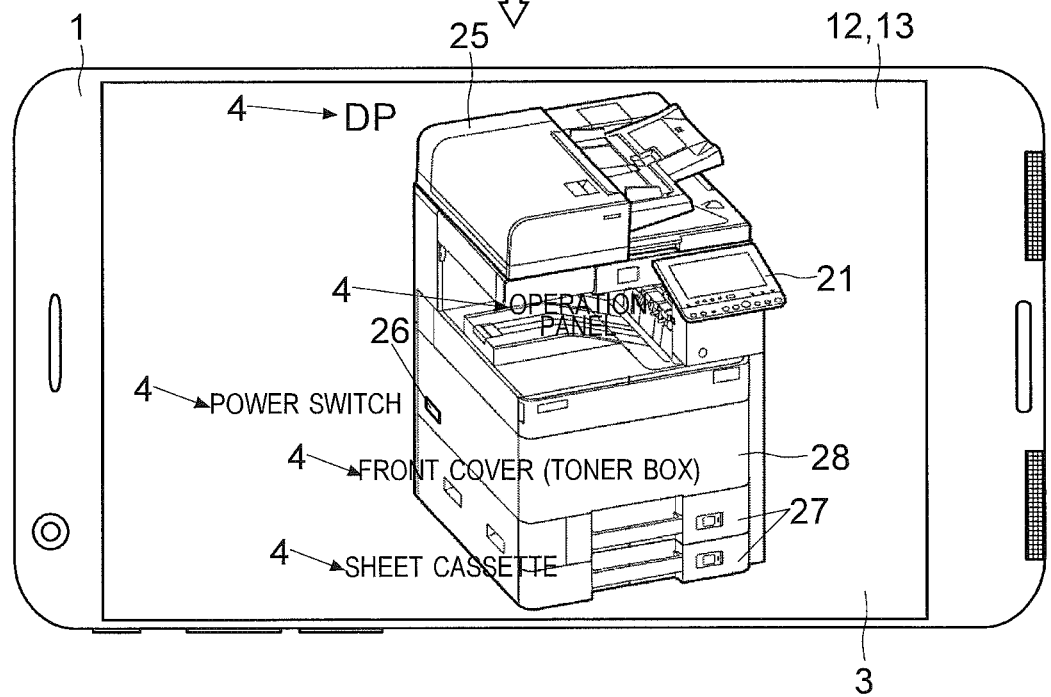

FIG. 6 shows one example of reducing an added image 4. Based on the output of the touch panel 13, the processing unit 10 recognizes that a reducing operation is performed. When a reducing operation is performed, the processing unit 10 makes the added image 4 on which the reducing operation is performed smaller than before the reducing operation. In this way, the added image 4 can be adjusted to the user's preferred size.

What operation to handle as a reducing operation can be determined as appropriate. The touch panel 13 accepts as a reducing operation an operation of making a two-point touch and then putting the fingers closer together (pinch-in operation). A condition is that, of the two touch start positions, at least one overlap the added image 4. After the two-point touch, when the distance between the touch positions decreases, the processing unit 10 recognizes that a reducing operation is performed. The upper section of FIG. 6 shows one example of the reducing operation. The lower section of FIG. 6 shows one example of the added image 4 for the power switch 26 after reduction.

The processing unit 10 reduces the added image 4 on which the reducing operation is performed (which is touched at the start of the two-point touch). The processing unit 10 may reduce the added image 4 at a previously determined magnification. The processing unit 10 may instead vary the magnification according to the distance between the two-point touch positions. For example, based on the output of the touch panel 13, the processing unit 10 calculates the difference between the distance at the end of the two-point touch and the distance at the start of the two-point touch. The smaller the difference in distance, the lower the processing unit 10 can make the magnification; the larger the difference in distance, the higher the processing unit 10 can make the magnification.

When an added image 4 is enlarged, part of the shot image 3 may become difficult to see. This can make the shot image 3 (real image) difficult to recognize. To cope with that, the processing unit 10 varies the degree of transparency of the added image 4 (character string) according to the magnification of the added image 4. In the following description, it is assumed that the default size of the added image 4 is 100%.

Specifically, the processing unit 10 makes the degree of transparency of the added image 4 (character string) higher after enlargement than before enlargement (see the lower section of FIG. 5). Moreover, the higher the magnification, the higher the processing unit 10 makes the degree of transparency of the added image 4. When increasing the degree of transparency, the processing unit 10 increases the proportion of the number of pixels that are made transparent among the pixels of the characters of the added image 4. At the pixels that are made transparent, the processing unit 10 has the shot image 3 displayed. Thus, the added image 4 (character string) appears to be transparent. By contrast, when reducing the enlarged added image 4, the processing unit 10 makes the degree of transparency of the added image 4 (character string) lower after reduction than before reduction (see the lower section in FIG. 6). When decreasing the degree of transparency, the processing unit 10 reduces the proportion of the number of pixels that are made transparent among the pixels of the characters of the added image 4.

(Changing the Degree of Transparency by a Rubbing Operation)

Next, with reference to FIG. 7, one example of changing the degree of transparency by a rubbing operation according to the embodiment will be described. Added images 4 overlap the image forming apparatus 2 in the shot image 3. Thus, part of the image forming apparatus 2 in the shot image 3 can be difficult to see. To cope with that, a configuration is adopted such that the degree of transparency of an added image 4 can be increased temporarily simply by performing a rubbing operation.

Figure 7:
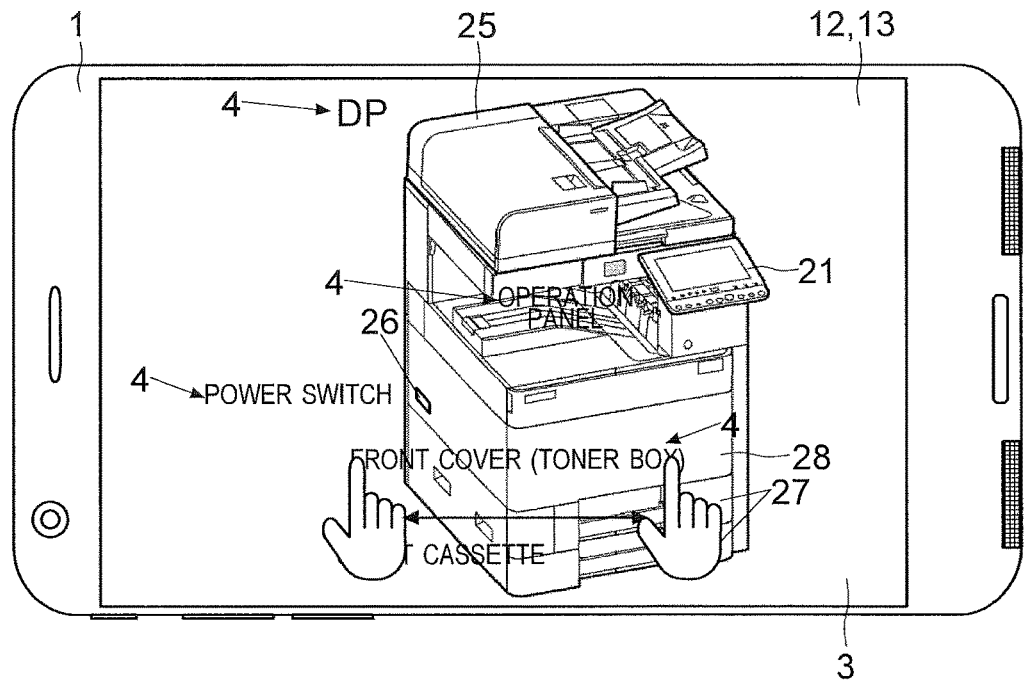
FIG. 7 is a diagram showing one example of changing a degree of transparency by a rubbing operation according to the embodiment.
Figure 7:
Figure 7:
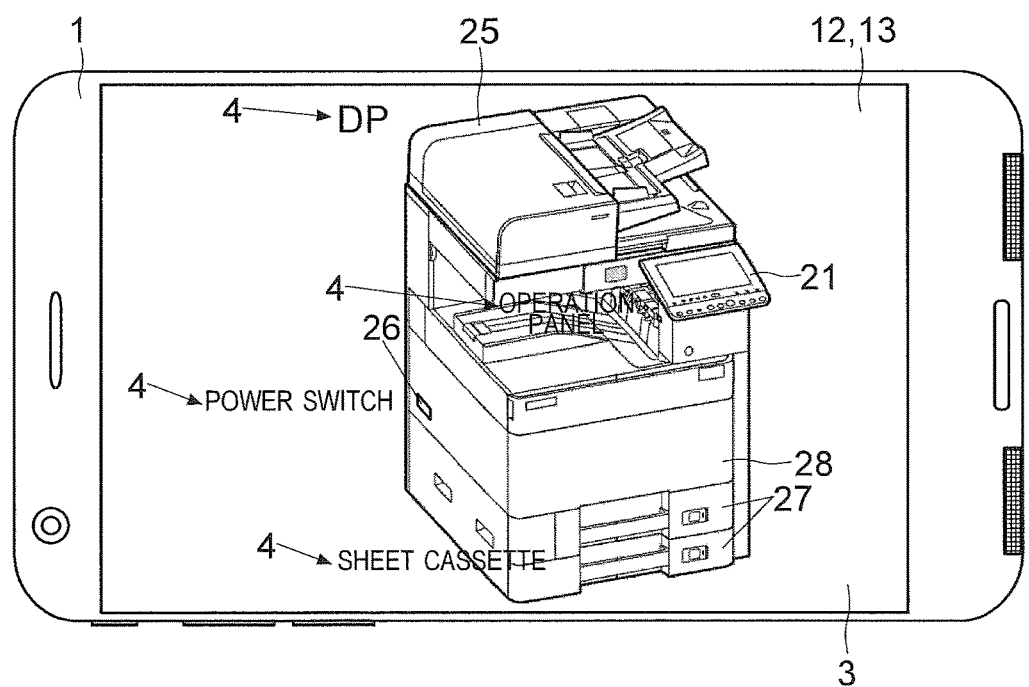

FIG. 7 shows one example of changing the degree of transparency of an added image 4 by a rubbing operation. The upper section of FIG. 7 shows one example of the rubbing operation. The upper section of FIG. 7 shows one example of performing the rubbing operation on the added image 4 for the front cover 28 (toner box). The lower section of FIG. 7 shows one example of a state where the added image 4 for the front cover 28 (toner box) is temporarily erased.

The rubbing operation is an operation of rubbing an added image 4. The rubbing operation is an operation of, while keeping a touch, reciprocating the touch position over an added image 4 (character string). The upper section of FIG. 7 shows one example of moving a touch position in the left-right direction. Based on the output of the touch panel 13, the processing unit 10 recognizes that a rubbing operation is performed. For example, when the movement direction of a touch position over an added image 4 (character string) has changed a predetermined number of times, the processing unit 10 recognizes that a rubbing operation is performed.

When the rubbing operation is performed, the processing unit 10 makes the degree of transparency of the added image 4 (character string) on which the rubbing operation is performed higher than before the rubbing operation. When increasing the degree of transparency, the processing unit 10 increases the proportion of the number of pixels that are made transparent among the pixels of the characters of the added image 4. At the pixels that are made transparent, the processing unit 10 has the shot image 3 displayed. For example, the processing unit 10 turns the degree of transparency of the added image 4 on which the rubbing operation is performed to 100%. The degree of transparency may be other than 100%.

When a previously determined recovery time has elapsed since the rubbing operation was performed, the processing unit 10 turns the degree of transparency of the added image 4 on which the rubbing operation was performed back to that before the rubbing operation. The recovery time is previously determined. The recovery time can be a length of time that allows recognition of the part that has been difficult to see. The recovery time can be, for example, any length of time between 0.5 to several seconds.

(Automatic Change of the Display Position of an Added Image 4)

Figure 8:
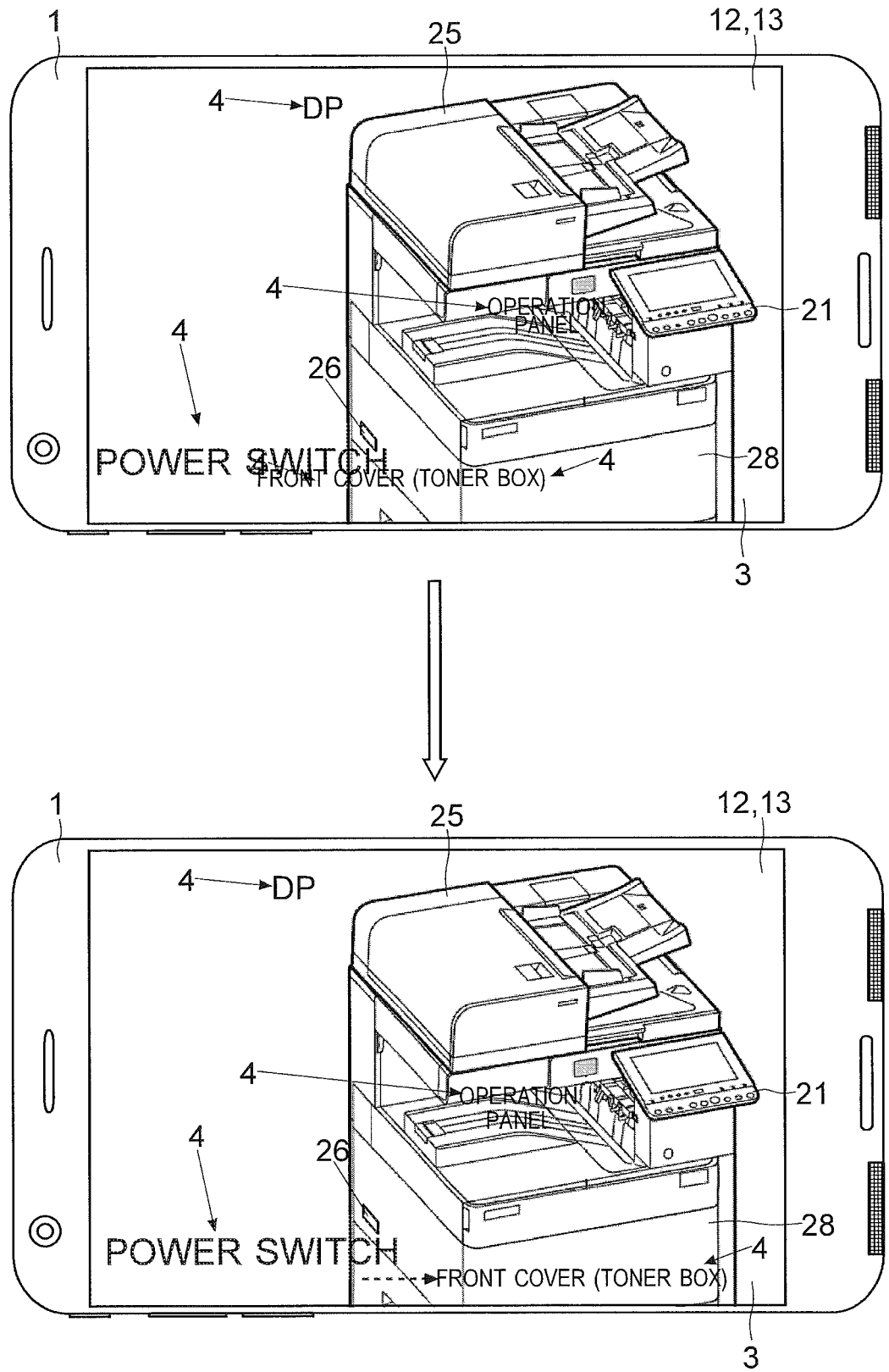
FIG. 8 is a diagram showing one example of automatic change of a display position of an added image according to the embodiment.

Next, with reference to FIG. 8, one example of automatic change of the display position of an added image 4 according to the embodiment will be described. Enlargement can cause added images 4 to overlap each other. Added images 4 overlapping each other can be difficult to see. To cope with that, the processing unit 10 automatically shifts the display position of an added image 4. FIG. 8 shows one example of automatic change of the display position of an added image 4. The upper section of FIG. 8 shows one example of a state immediately after the added image 4 for the power switch 26 is enlarged. The lower section of FIG. 8 shows one example of a state where the display position of the added image 4 is shifted automatically.

When added images 4 overlap with each other after enlargement, the processing unit 10 prevents the added images 4 from overlapping each other. The processing unit 10 shifts the display position of, of the added images 4 overlapping each other, any other than the enlarged added image 4. In the lower section of FIG. 8, the processing unit 10 has automatically moved the added image 4 for the front cover (toner box) rightward. When enlargement causes added images 4 to overlap, an unenlarged added image 4 appears to be flicked aside. This eliminates difficulty seeing.

(Changing the Degree of Transparency of an Added Image 4)

Next, with reference to FIGS. 9 and 10, one example of display setting based on a menu in the display device 1 according to the embodiment will be described. It will be convenient when the degree of transparency of an added image 4 can be changed irrespective of enlargement or reduction. For example, the degree of transparency of an added image 4 can then be changed to make the characters in the added image 4 or the shot image 3 easier to see. Accordingly, in the display device 1, the degree of transparency of added images 4 (character strings) can be changed freely.

Based on the output of the touch panel 13, the processing unit 10 recognizes that a transparency setting operation is performed. When a transparency setting operation is performed, the processing unit 10 makes the display 12 display an added image 4 with the set degree of transparency. When setting the degree of transparency of an added image 4, the user have a menu image 5 displayed. When any one added image 4 is long-pressed, the processing unit 10 makes the display 12 display the menu image 5.

Based on the output of the touch panel 13, the processing unit 10 recognizes that a long-press operation is performed. After a touch is sensed, when the touch position remains unmoved for a previously determined long-press period, the processing unit 10 recognizes that a long-press operation is performed. The touch position may swing slightly. To cope with that, after a touch is sensed, when the amount of movement of the touch position within the long-press period is within a previously determined permissible range, the processing unit 10 recognizes that a long-press operation is performed.

Figure 9:
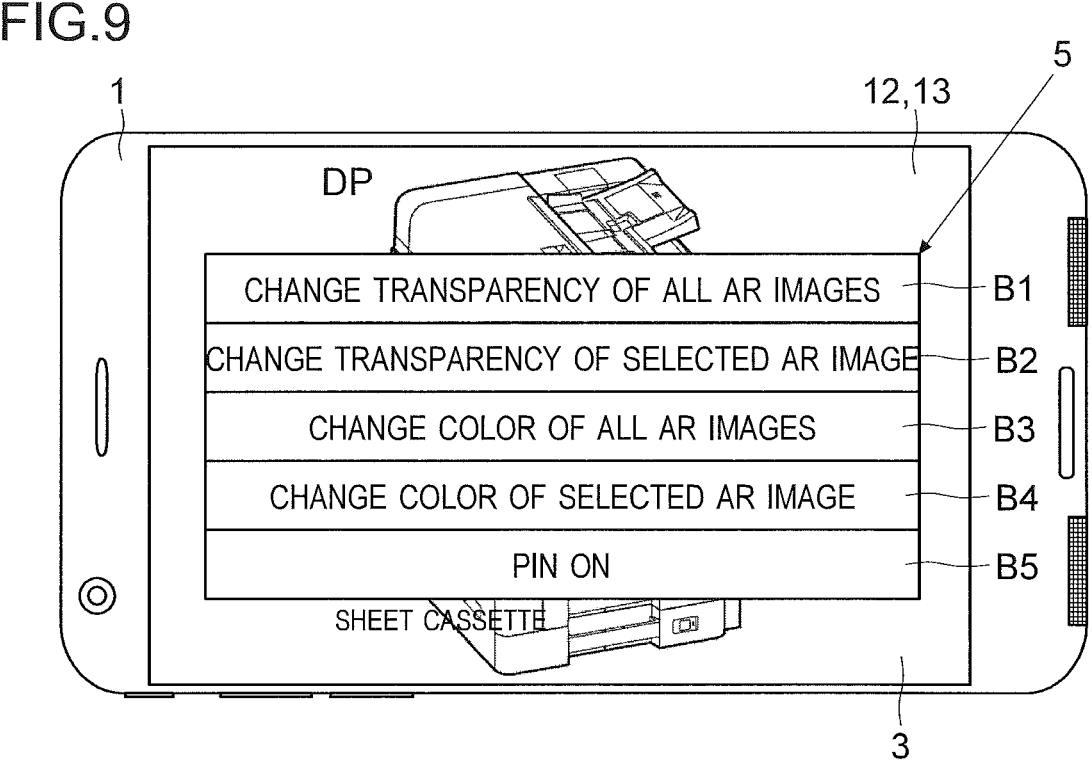
FIG. 9 is a diagram showing one example of a menu image according to the embodiment.
Figure 10:
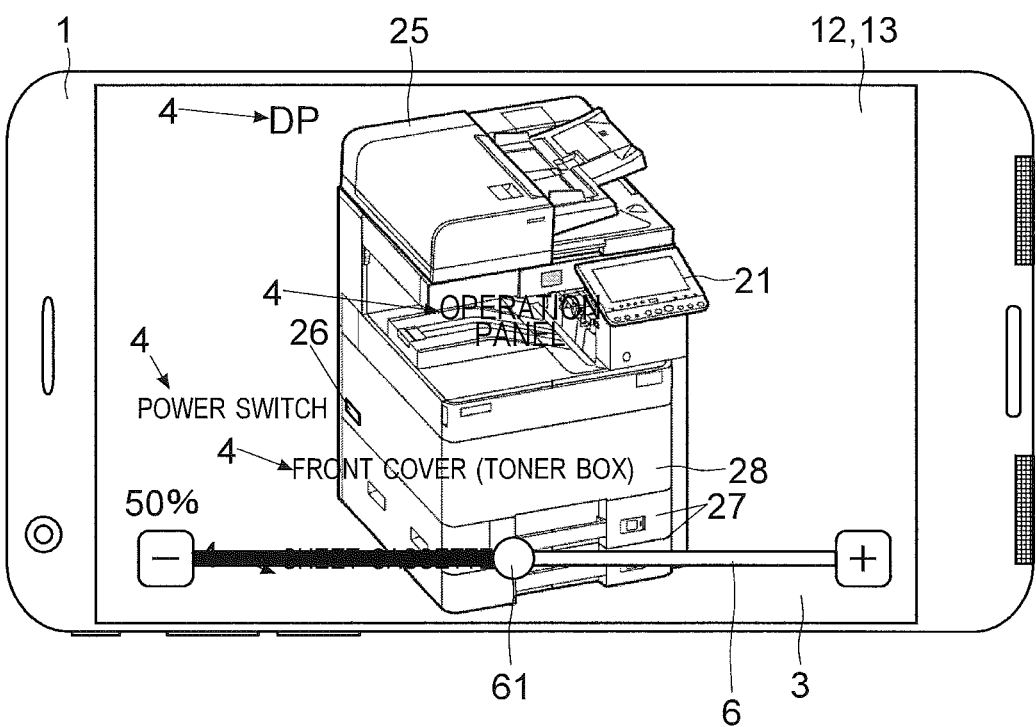
FIG. 10 is a diagram showing one example of a slide bar for setting a degree of transparency according to the embodiment.

FIG. 9 shows one example of the menu image 5 that is displayed when an added image 4 is long-pressed. The menu image 5 includes a first transparency setting button B1 and a second transparency setting button B2. When changing the degree of transparency of all added images 4 (character strings) at once, the user operates the first transparency setting button B1. When changing the degree of transparency of only a long-pressed added image 4 (character string), the user operates the second transparency setting button B2. Based on the output of the touch panel 13, the processing unit 10 recognizes that the first transparency setting button B1 is operated. Based on the output of the touch panel 13, the processing unit 10 recognizes that the second transparency setting button B2 is operated.

When the first or second transparency setting button B1 or B2 is operated, the processing unit 10 makes the display 12 display a slide bar 6 for transparency setting. FIG. 10 shows one example of the slide bar 6 displayed on the display 12. The slide bar 6 includes a knob image 61. By sliding the knob image 61 while keeping a touch on it, the user can set the degree of transparency. The processing unit 10 recognizes that the knob image 61 is operated. Based on the position at which the knob image 61 is released, the processing unit 10 recognizes the set degree of transparency. FIG. 10 shows a state where the degree of transparency is set at 50%.

When the first transparency setting button B1 has been operated (when an operation to change the degree of transparency of all added images 4 has been performed), the processing unit 10 changes the degree of transparency of all added images 4 (character strings) to the set degree of transparency. When the second transparency setting button B2 has been operated (when an operation to change the degree of transparency of one added image 4 has been performed), the processing unit 10 changes the degree of transparency of the long-pressed added image 4 to the set degree of transparency. In this case, the degree of transparency of no other added images 4 is changed. For example, when the degree of transparency is set at 50%, the processing unit 10 makes 50% of the pixels of the characters of the added image 4 transparent. For example, the processing unit 10 makes one of every two adjacent pixels transparent. At the pixels that are made transparent, the processing unit 10 has the shot image 3 displayed.

(Changing the Color of an Added Image 4)

Figure 11:
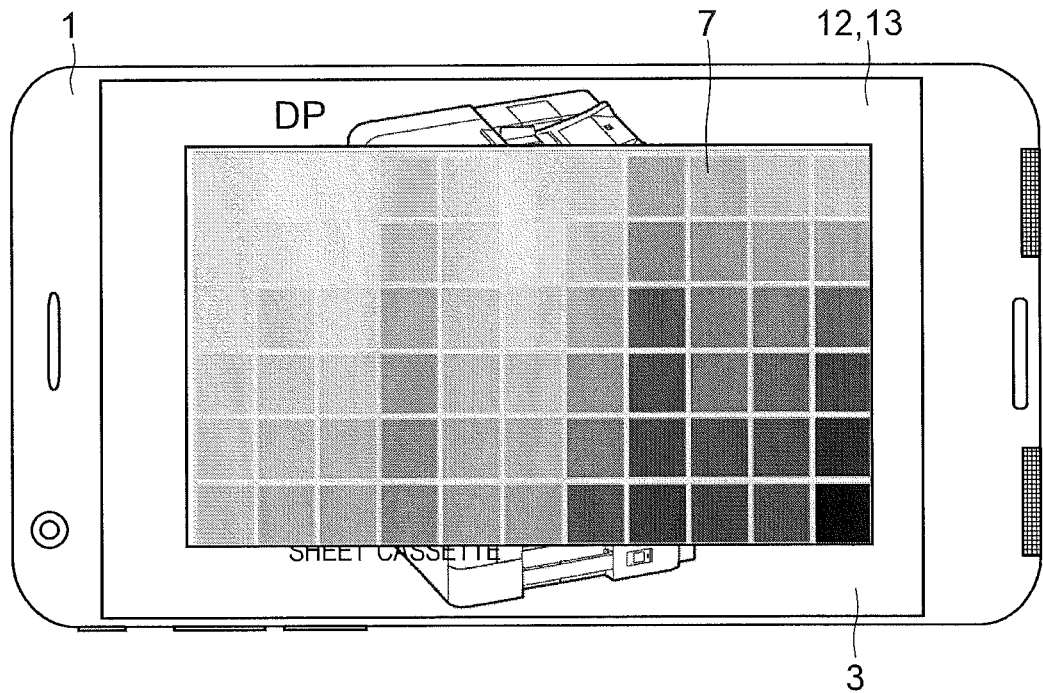
FIG. 11 is a diagram showing one example of a color selection palette according to the embodiment.

Next, with reference to FIGS. 9 and 11, one example of display setting based on a menu in the display device 1 according to the embodiment will be described. A case can arise where an added image 4 (character string) is difficult to see and the color of the added image 4 needs to be changed. A case can also arise where the color of an added image 4 needs to be changed to the user's preferred color. To cope with that, in the display device 1, the color of an added image 4 can be changed. Based on the output of the touch panel 13, the processing unit 10 recognizes that a color selection operation is performed. When a color selection operation is performed, the processing unit 10 makes the display 12 display an added image 4 using the selected color. When selecting the color of an added image 4, the user have a menu image 5 displayed.

FIG. 9 shows one example of the menu image 5 displayed when an added image 4 is long-pressed. The menu image 5 includes a first color selection button B3 and a second color selection button B4. When changing the color of all added images 4 (character strings) at once, the user operates the first color selection button B3. When changing the color of only a long-pressed added image 4 (character string), the user operates the second color selection button B4. Based on the output of the touch panel 13, the processing unit 10 recognizes that the first color selection button B3 is operated. Based on the output of the touch panel 13, the processing unit 10 recognizes that the second color selection button B4 is operated.

When the first or second color selection button B3 or B4 is operated, the processing unit 10 makes the display 12 display a color selection palette 7. FIG. 11 shows an example of the color selection palette 7 displayed on the display 12. The color selection palette 7 includes color sample images of a plurality of colors. The processing unit 10 makes the display 12 display the color sample images of different colors. By touching any of the color sample images, the user selects a color. Based on the output of the touch panel 13, the processing unit 10 recognizes the operated color sample image.

When the first color selection button B3 has been operated (when an operation to change the color of all added images 4 has been performed), the processing unit 10 changes the color of all added images 4 (character strings) to the selected color. When the second color selection button B4 has been operated (when an operation to change the color of one added image 4 has been performed), the processing unit 10 changes the color of the long-pressed added image 4 (character string) to the selected color. The color of no other added images 4 is changed. For example, when red is selected, the processing unit 10 changes the color of the character strings of all or one added image 4 to red.

(Pinning on an Added Image 4)

Figure 12:
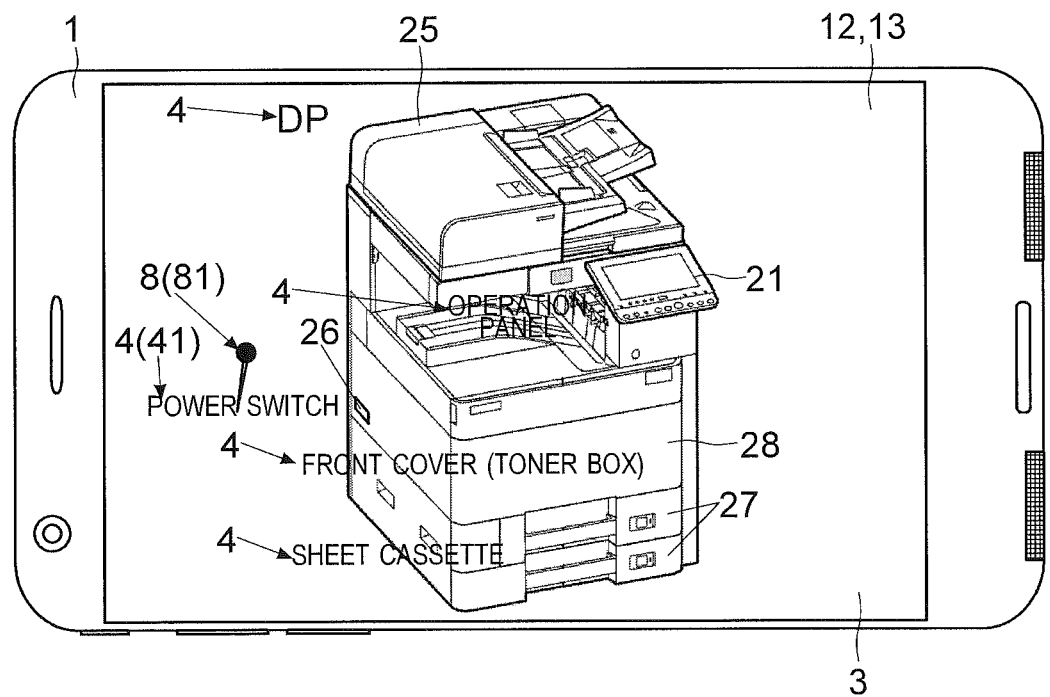
FIG. 12 is a diagram showing one example of starting display of a token image according to the embodiment.

Next, with reference to FIGS. 9 and 12, one example of a token image 8 in the display device 1 according to the embodiment will be described. A case can arise where a displayed added image 4 needs to be marked with a token. For example, it will be convenient when a segment to be paid attention to or a segment to be checked again later can be marked with a token. Accordingly, in the display device 1, an added image 4 (character string) can be marked with a token. In the current description, marking with a token is occasionally referred to as pinning on. When a pinning-on operation is performed, the processing unit 10 makes the display 12 start to display a token image indicating a pin. When marking with a token image 8, the user has a menu image 5 displayed.

FIG. 9 shows one example of the menu image 5 displayed when an added image 4 is long-pressed. The menu image 5 includes a pin-on button B5. An operation of touching the pin-on button B5 is a pinning-on operation. Based on the output of the touch panel 13, the processing unit 10 recognizes that the pin-on button B5 is operated. In other words, the processing unit 10 recognizes that a pinning-on operation is performed. The processing unit 10 recognizes, as the added image 4 on which the pinning-on operation is performed, the added image 4 that has been long-pressed and on which the pinning-on operation has been performed on the menu image 5. In the following description, the added image 4 on which the pinning-on operation is performed is referred to as the pinned-on added image 41.

When the pin-on button B5 is operated, the processing unit 10 makes the display 12 start to display a token image 8 indicating a pin. The token image 8 is an image depicting a pin for pinning on a memo or a piece of paper. The processing unit 10 makes the display 12 display the token image 8 such that it overlaps the added image 4 on which the pinning-on operation is performed. The processing unit 10 sticks the tip of the pin in the token image 8 into the center of the added image 4 (character string). In other words, the processing unit 10 makes the position of the tip of the pin in the token image 8 coincide with the center position of the added image 4. Thus, the added image 4 appears to be pinned on.

(Continued Display of a Token Image 8)

Next, with reference to FIGS. 13 and 14, one example of continued display of a token image 8 according to the embodiment will be described. The image shot by the image shooting unit 14 is displayed on the display 12. As the person holding the display device 1 moves, the shot image 3 changes. As a result, a particular segment corresponding to a pinned-on added image 41 can cease to be included in the shot image 3. When a particular segment corresponding to a pinned-on added image 41 ceases to be included in the shot image 3, the processing unit 10 has the pinned-on added image 41 erased from the display unit (see FIG. 13). Basically, the processing unit 10 does not make the display 12 display the added image 4 of a particular segment that has ceased to be recognized in the shot image 3.

Figure 13:
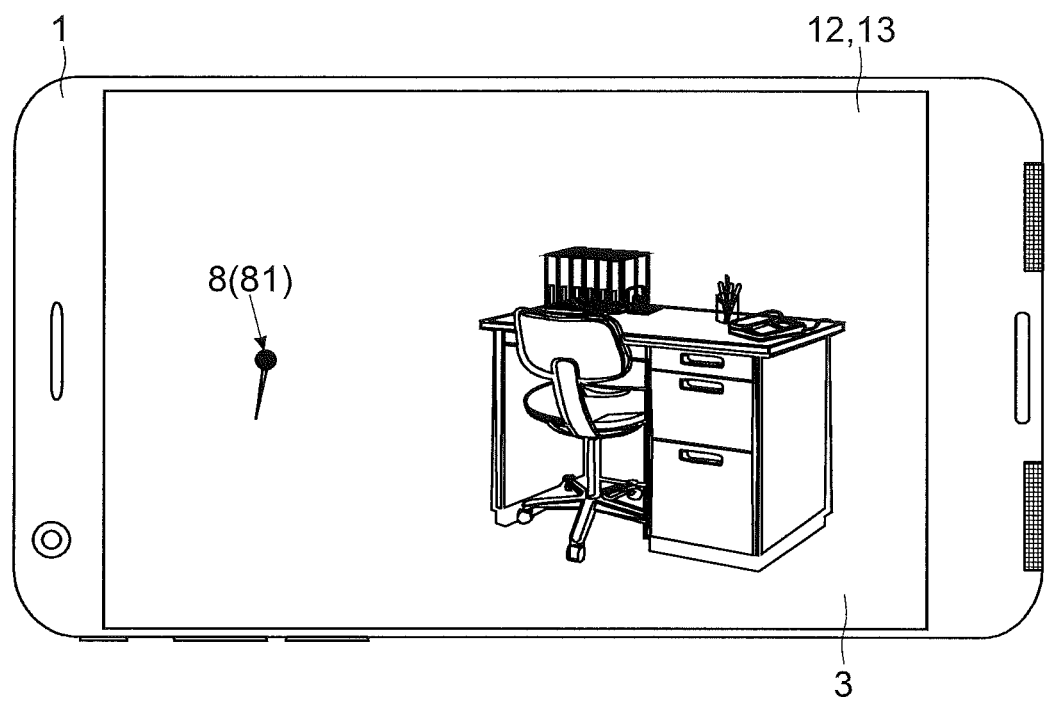
FIG. 13 is a diagram showing one example of continuing display of a token image according to the embodiment.
Figure 14:
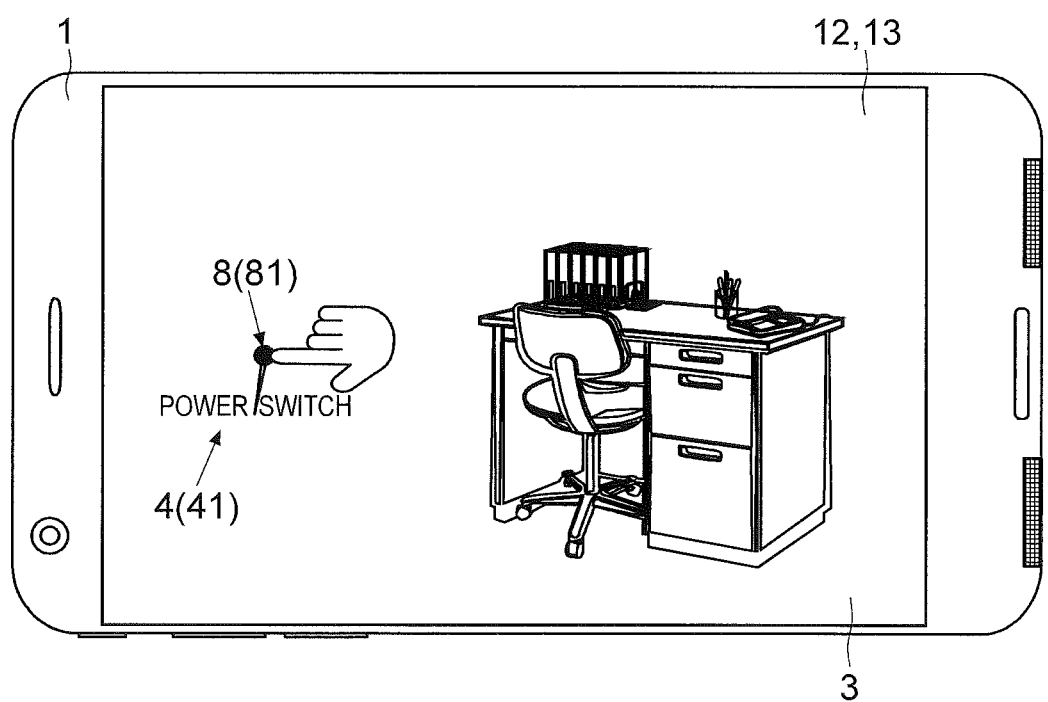
FIG. 14 is a diagram showing one example of temporary re-displaying of a pinned-on added image according to the embodiment.

On the other hand, as shown in FIG. 13, the processing unit 10 makes the display 12 continue to display the token image 8. That is, even when the particular segment corresponding to the pinned-on added image 41 is not included in the shot image 3, the processing unit 10 makes the display 12 display the token image 8. The display position of the token image 8 is the same position as the display start position of the token image 8.

A case can arise where the added image 4 (pinned-on added image 41) corresponding to the token image 8 needs to be confirmed. To cope with that, as shown in FIG. 14, when the token image 8 is operated (touched), the processing unit 10 makes the display 12 temporarily display the added image 4 corresponding to the operated token image 8. FIG. 14 shows an example of an added image 4 (character string) that is displayed when a token image 8 is operated (touched). The processing unit 10 makes the display 12 display the pinned-on added image 41, for example, only for one to several seconds.

Even when the particular segment corresponding to the pinned-on added image 41 has ceased to be included in the shot image 3, the processing unit 10 may make the display 12 continue to display the pinned-on added image 41 along with the token image 8.

(Direction Display for a Pinned-on Particular Segment)

Next, with reference to FIGS. 15 and 16, one example of direction display for a pinned-on particular segment will be described. As the user moves, the display device 1 moves together. The processing unit 10 makes the display 12 display a direction indication image 9 which indicates the direction of the particular segment corresponding to a pinned-on added image 41. When the particular segment corresponding to the pinned-on added image 41 is not included in the shot image 3, the processing unit 10 have the direction indication image 9 displayed.

The processing unit 10 recognizes the AR marker of each particular segment included in the shot image 3. The processing unit 10 makes the storage unit 11 store, for each shot image 3, the center position (coordinates) of each AR marker. Based on the time-related change of the coordinates of the AR marker of each particular segment, the processing unit 10 recognizes the movement direction of each particular segment on the display 12.

Based on the movement direction, the processing unit 10 recognizes the direction of a particular segment that has ceased to be included in the shot image 3. For example, when the AR marker of a particular segment has moved leftward and disappeared, the processing unit 10 judges that the particular segment is present in the left direction. Based on this judgment, the processing unit 10 makes the display 12 display a direction indication image 9 which indicates the direction identified for the particular segment corresponding to the pinned-on added image 41.

Figure 15:
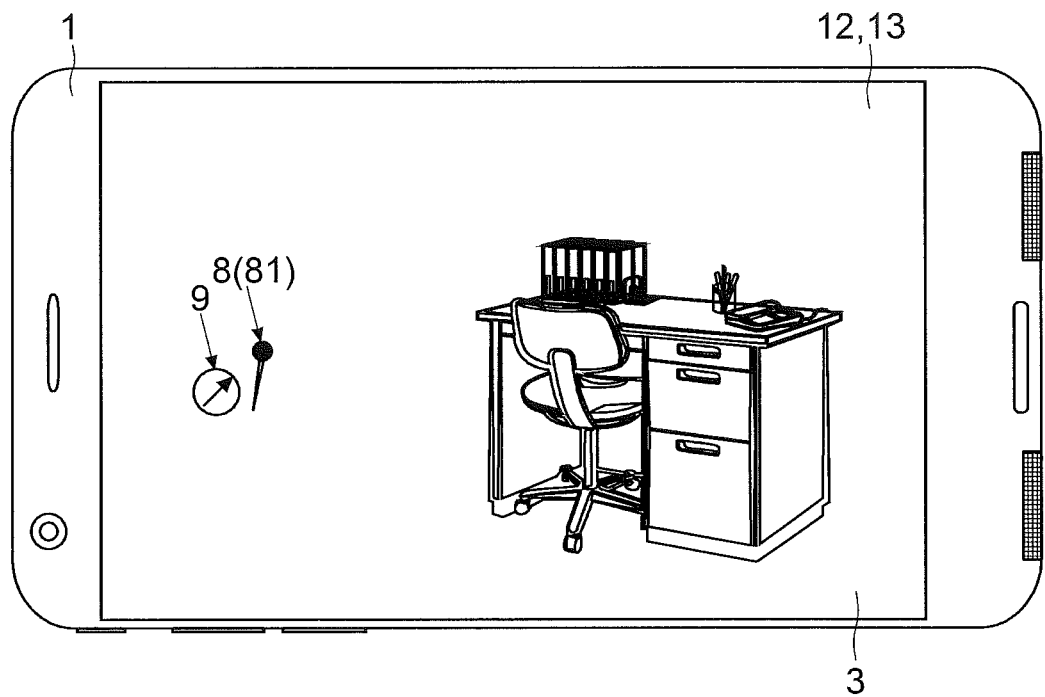
FIG. 15 is a diagram showing one example of displaying a direction of a pinned-on particular segment according to the embodiment.
Figure 16:
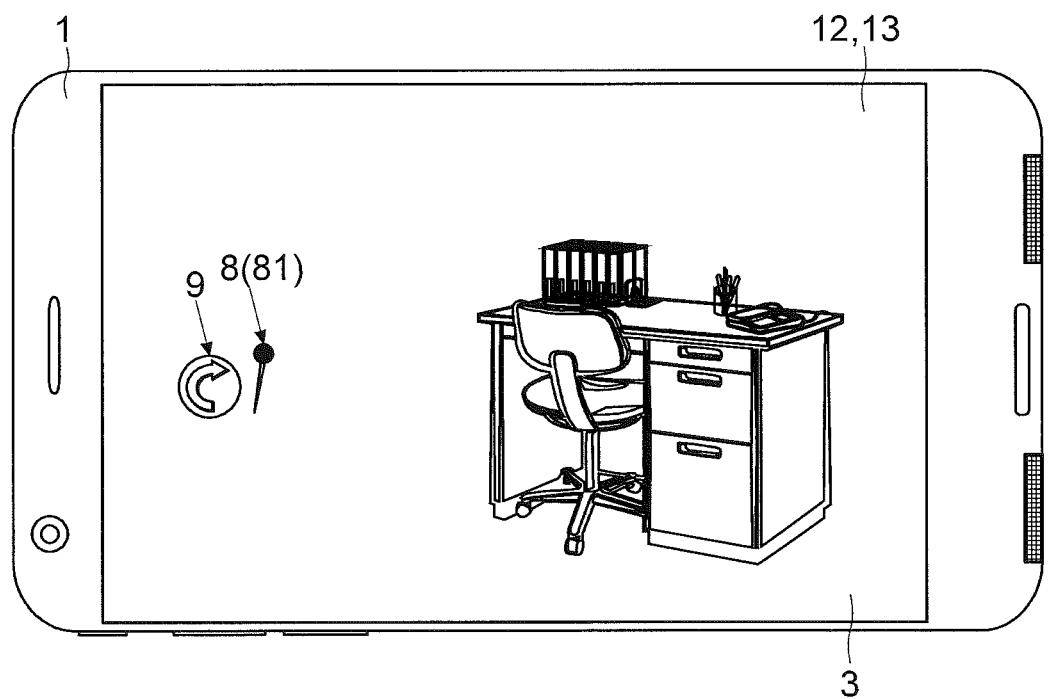
FIG. 16 is a diagram showing one example of displaying a direction of a pinned-on particular segment according to the embodiment.

FIG. 15 shows one example of the direction indication image 9. In FIG. 15, the processing unit 10 judges that the particular segment corresponding to the pinned-on added image 41 is present in the upper right direction. The direction indication image 9 is a circular icon. The processing unit 10 has an arrow indicating the identified direction displayed inside the icon. FIG. 15 shows an example where the direction indication image 9 is displayed at the left side of the token image 8. The processing unit 10 has the direction indication image 9 displayed near the token image 8.

Here, based on the output (direction of acceleration) of the acceleration sensor 15, the processing unit 10 may recognize the walking pattern (movement pattern) of the display device 1. The processing unit 10 recognizes the walking pattern since the disappearance of the particular segment corresponding to the pinned-on added image 41 up to the current time. When the walking pattern is a turning pattern, the processing unit 10 may have a curved arrow displayed as the direction indication image 9. The curved arrow indicates that, to reach the particular segment corresponding to the pinned-on added image 41, one needs to move so as to turn (make a detour). FIG. 16 shows one example of the direction indication image 9 including a curved arrow.

(Erasing Operation for a Token Image 8)

Figure 17:
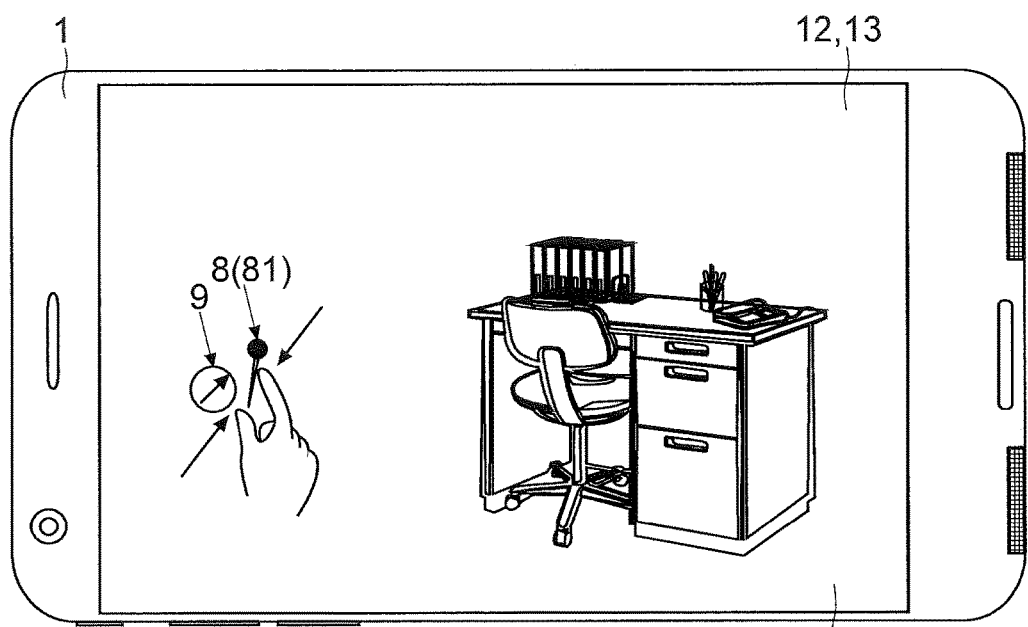
FIG. 17 is a diagram showing one example of an erasing operation for a token image according to the embodiment.
Figure 17:
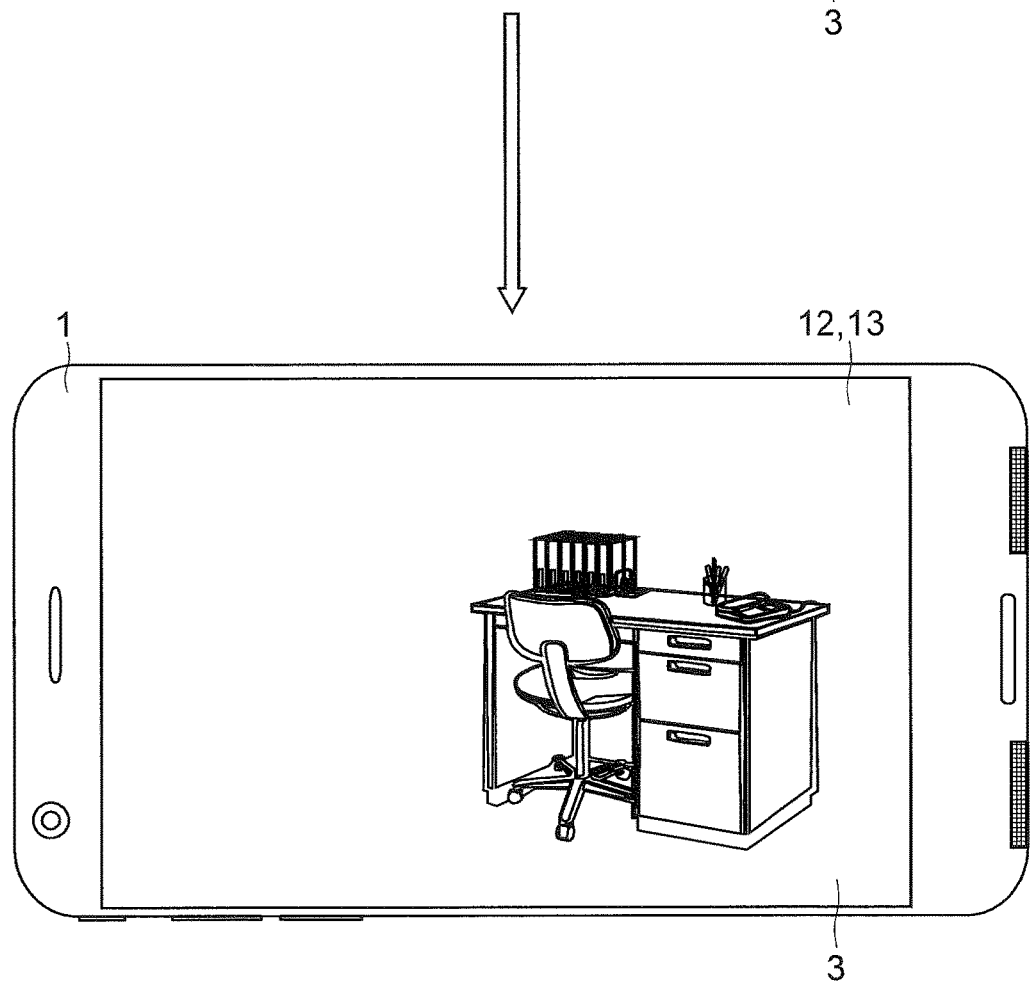

Next, with reference to FIG. 17, one example of an erasing operation for a token image 8 according to the embodiment will be described. A case can arise where the user wishes to erase an unnecessary token image 8. In other words, a case can arise where a pinning-on operation needs to be canceled. To cope with that, in the display device 1, a configuration is adopted such that the token image 8 can be erased by user operation. FIG. 17 shows an example of erasing a token image 8. Based on the output of the touch panel 13, the processing unit 10 recognizes that an erasing operation is performed. When an erasing operation is performed, the processing unit 10 makes the display 12 erase the token image 8 for which the erasing operation is performed. Thus, an unnecessary token image 8 can be erased.

What operation to handle as an erasing operation can be determined as appropriate. In the display device 1, the processing unit 10 recognizes as an erasing operation an operation involving making a two-point touch, then moving the fingers closer together as if pinching the token image 8, and then removing the fingers from the touch panel 13. That is, the erasing operation is an operation as if pinching and pulling out the token image 8. The erasing operation resembles an operation of actually pulling off a pin. The erasing operation is an intuitive, easy-to-grasp operation. The upper section of FIG. 17 shows one example of the erasing operation. The lower section of FIG. 17 shows one example of the shot image 3 after the erasure of the token image 8.

(Sticking-In Operation for a Token Image 8)

Figure 18:
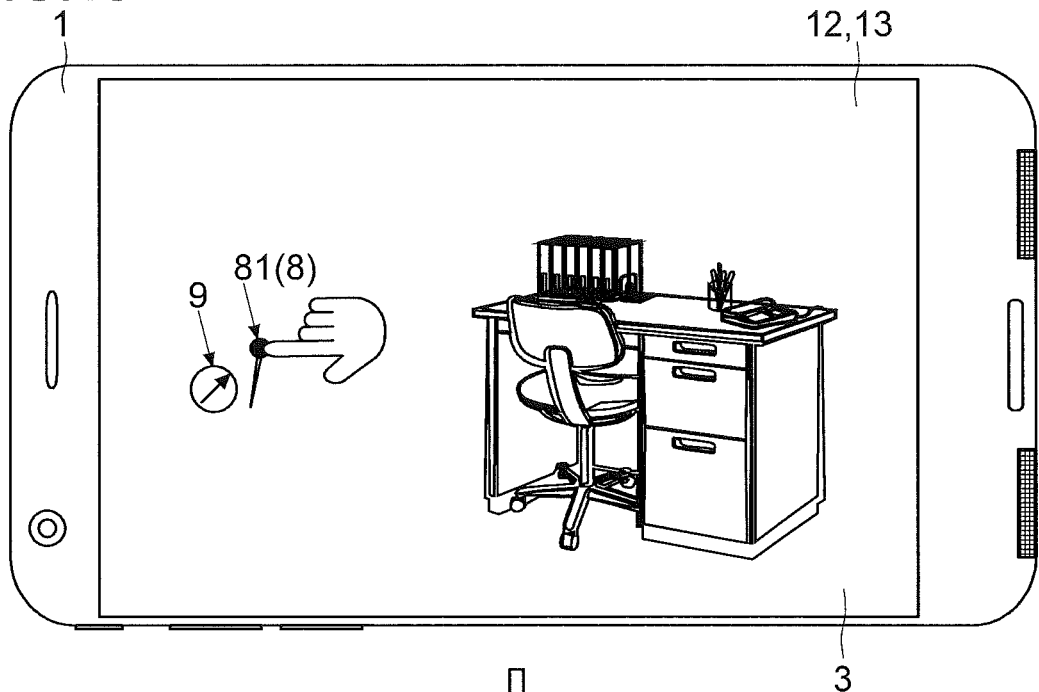
FIG. 18 is a diagram showing one example of a sticking-in operation for a token image according to the embodiment.
Figure 18:
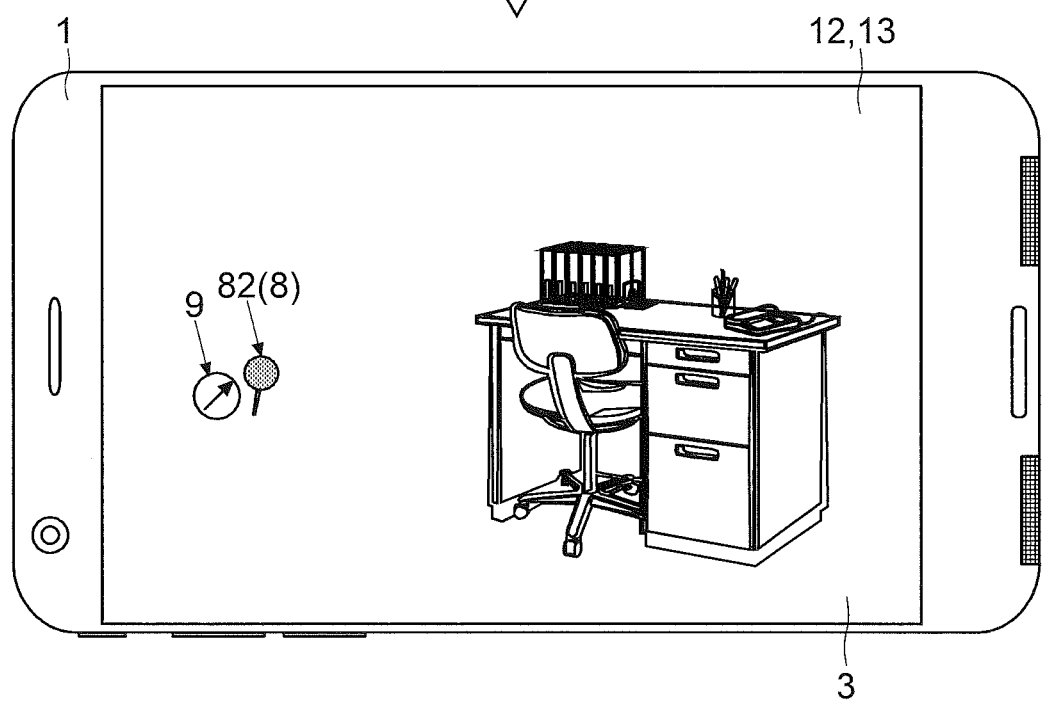

Next, with reference to FIG. 18, one example of a sticking-in operation for a token image 8 will be described. When actually pinning on an important piece of paper or a memo, a person tends to stick in the pin firmly. The aim is to prevent the important piece of paper from dropping off easily. Accordingly, in the display device 1, a configuration is adopted such that the level of firmness of pinning-on can be changed. FIG. 18 shows the sticking-in operation and the change of the token image 8 based on the change of the level of pinning-on. Based on the output of the touch panel 13, the processing unit 10 recognizes the sticking-in operation on the token image 8. When the sticking-in operation is performed, the processing unit 10 changes the token image 8 on which the sticking-in operation is performed. The processing unit 10 makes the display 12 display a token image 8 that reflects the level of firmness of pinning-on.

What operation to handle as a sticking-in operation can be determined as appropriate. In the display device 1, the touch panel 13 accepts as a sticking-in operation an operation of long-pressing the token image 8. The upper section of FIG. 18 shows one example of the sticking-in operation. The sticking-in operation resembles an operation of actually sticking a pin deep in over time. The sticking-in operation is an intuitive, easy-to-grasp operation.

In the following description, the token image 8 before the sticking-in operation is referred to as the first token image 81. The first token image 81 is the token image 8 that is displayed first when the sticking-in operation is performed. On the other hand, the token image 8 after the sticking-in operation is referred to as the second token image 82. The second token image 82 is the token image 8 that is displayed in place of the first token image 81 after the sticking-in operation.

The lower section of FIG. 18 shows one example of the second token image 82. As shown in FIG. 18, the processing unit 10 may make the part representing the needle of the pin in the second token image 82 shorter than in the first token image 81. Thus, the second token image 82 virtually shows the pin to have been stuck in firmly. The processing unit 10 may make the part representing the head of the pin in the second token image 82 larger than in the first token image 81. The processing unit 10 may change the color of the part representing the head of the pin in the second token image 82 from that in the first token image 81. That is, the processing unit 10 makes one or more of the shape, size, and color of the second token image 82 different than in the first token image 81.

(Automatic Erasure of a Token Image 8)

Next, with reference to FIGS. 19 and 20, one example of the flow of automatic erasure of a token image 8 in the display device 1 according to the embodiment will be described. Too many unnecessary token images 8 make the shot image 3 difficult to see. To cope with that, in the display device 1, token images 8 that are supposed to be unnecessary are erased automatically. Moreover, according to the degree of importance (level of firmness of pinning-on) of token images 8, the trigger for automatic erasure is changed.

Figure 19:
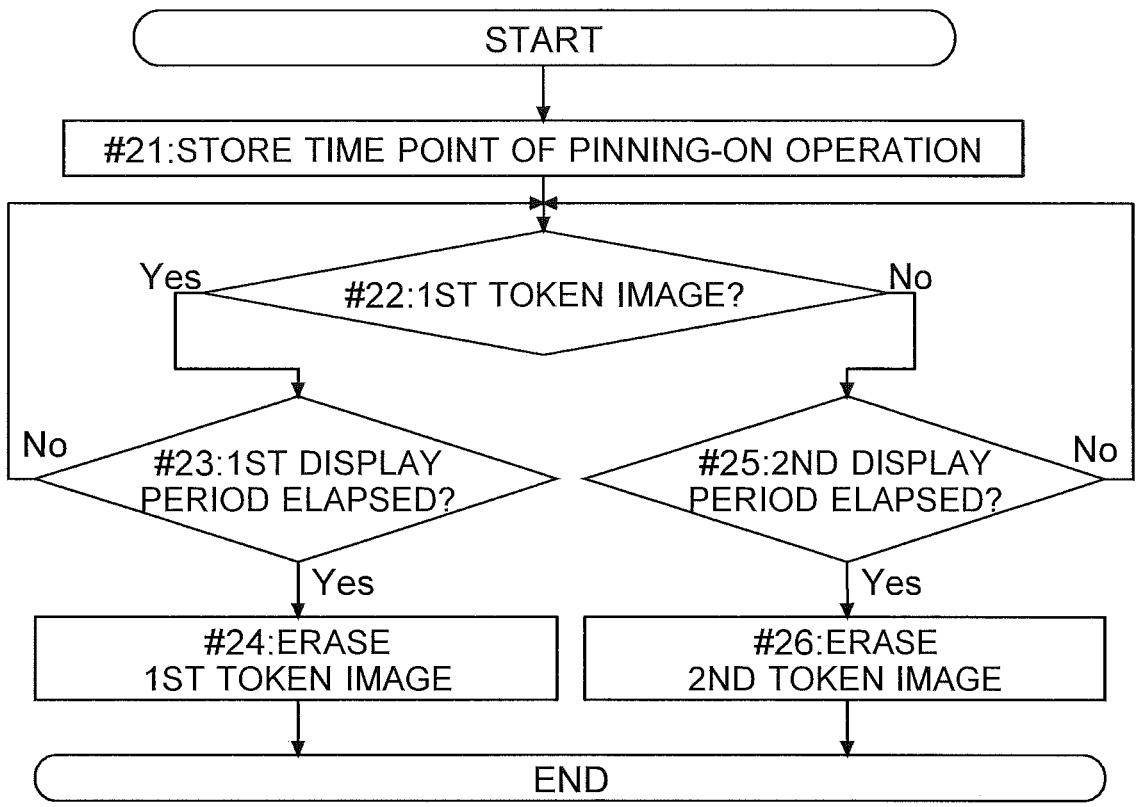
FIG. 19 is a flow chart showing one example of automatic erasure of a token image in the display device according to the embodiment.
Figure 20:
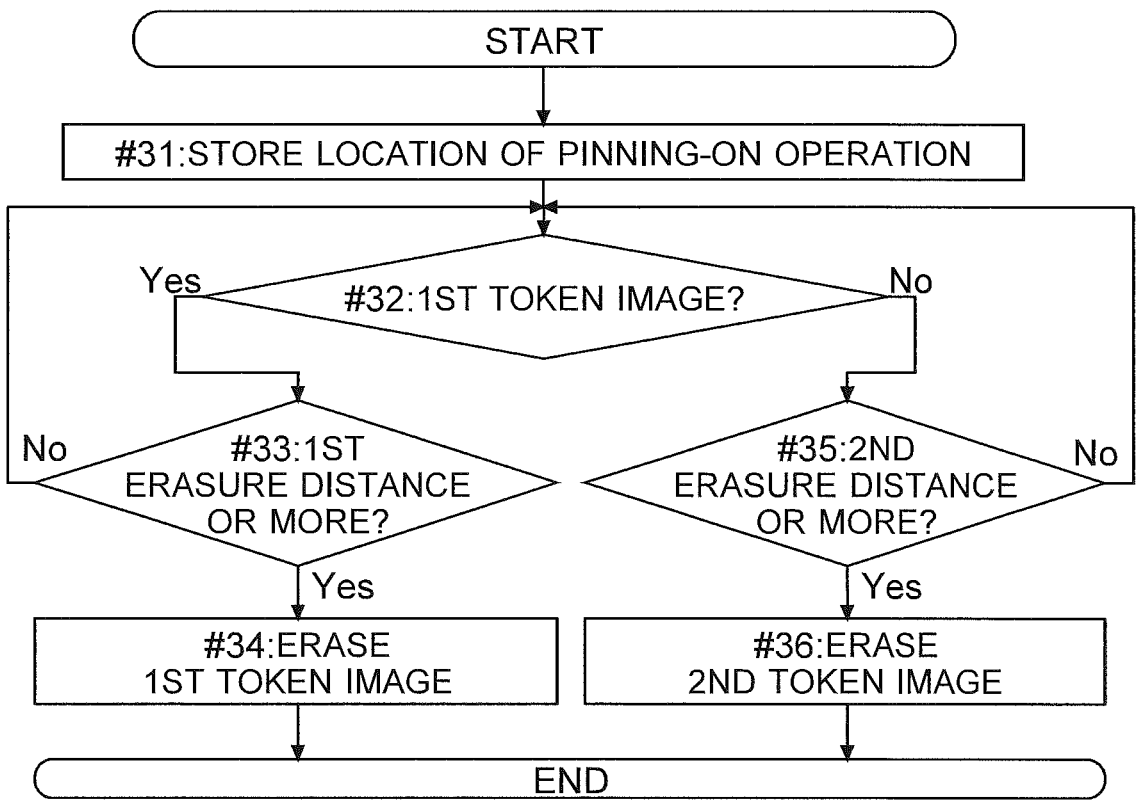
FIG. 20 is a flow chart showing one example of automatic erasure of a token image in the display device according to the embodiment.

The flows shown in FIGS. 19 and 20 are executed for each token image 8. The flow chart in FIG. 19 shows one example of processing for automatically erasing a token image 8 based on the time that has elapsed since a pinning-on operation. The flow chart in FIG. 20 shows one example of processing for automatically erasing a token image 8 based on the movement distance from the location at which the pinning-on operation is performed.

First, the flow chart in FIG. 19 will be described. The flow in FIG. 19 starts at the time point that a pinning-on operation is performed. First, the processing unit 10 makes the storage unit 11 store the time point (time) at which the pinning-on operation is performed (step #21). The display device 1 includes a clock circuit (unillustrated) to recognize date and time (time, hour). The processing unit 10 communicates with the clock circuit to acquire date and time.

Next, the processing unit 10 checks whether or not the target token image 8 is a first token image 81 (step #22). When the token image 8 is a first token image 81 (when it is not a second token image 82; step #22, Yes), the processing unit 10 checks whether or not a first display period has elapsed since the pinning-on operation (step #23). When the first display period has not elapsed (step #23, No), the flow returns to step #22. On the other hand, when the first display period has elapsed (step #23, Yes), the processing unit 10 makes the display 12 erase the first token image 81 (step #24). The flow then ends (END).

When the token image 8 is a second token image 82 (when it is not a first token image 81; step #22, No), the processing unit 10 checks whether or not a second display period has elapsed since the pinning-on operation (step #25). When the second display period has not elapsed (step #25, No), the flow returns to step #22. On the other hand, when the second display period has elapsed (step #25, Yes), the processing unit 10 makes the display 12 erase the second token image 82 (step #26). The flow then ends (END).

The first and second display periods are determined previously. The touch panel 13 may accept settings as to the first and second display periods. Here, the first display period is made shorter than the second display period. Thus, the display period of the second token image 82 is longer than the display period of the first token image 81. The higher the level of firmness of pinning-on, the less soon automatic erasure takes place.

Next, the flow chart in FIG. 20 will be described. The flow in FIG. 20 starts at the time point that a pinning-on operation is performed. First, the processing unit 10 makes the storage unit 11 store the location (coordinates) at which the pinning-on operation is performed (step #31). As shown in FIG. 1, the processing unit 10 includes the GPS signal processing unit 16. The processing unit 10 makes the GPS signal processing unit 16 operate. The processing unit 10 acquires the location (coordinates) sensed by the GPS signal processing unit 16. The processing unit 10 makes the storage unit 11 store the acquired location.

Next, the processing unit 10 checks whether or not the target token image 8 is a first token image 81 (step #32). When the token image 8 is a first token image 81 (when it is not a second token image 82; step #32, Yes), the processing unit 10 checks whether or not the distance between the location at which the pinning-on operation was performed and the current location is equal to or more than a first erasure distance (step #33). When it is less than the first erasure distance (step #33, No), the flow returns to step #32. On the other hand, when it is equal to or more than the first erasure distance (step #33, Yes), the processing unit 10 makes the display 12 erase the first token image 81 (step #34). The flow then ends (END).

When the token image 8 is a second token image 82 (when it is not a first token image 81; step #32, No), the processing unit 10 checks whether or not the distance between the location at which the pinning-on operation was performed and the current location is equal to or more than a second erasure distance (step #35). When it is less than the second erasure distance (step #35, No), the flow returns to step #32. On the other hand, when it is equal to or more than the second erasure distance (step #35, Yes), the processing unit 10 makes the display 12 erase the second token image 82 (step #36). The flow then ends (END).

Here, the first and second erasure distances are determined previously. The touch panel 13 may accept settings as to the first and second erasure distances. The first erasure distance is made shorter than the second erasure distance. The higher the level of firmness of pinning-on, the less soon automatic erasure takes place.

(Resetting Display)

Next, with reference to FIG. 21, one example of the resetting of display in the display device 1 according to the embodiment will be described. In the display device 1, it is possible to enlarge or reduce the added image 4, to change its degree of transparency, to change its display position, to change its color, to add the token image 8, and to change the level of firmness of the sticking-in of the token image 8. A case can arise where, after an erroneous operation, display on the display 12 needs to be reset. To cope with that, in the display device 1, a configuration is adopted such that display can be reset. In the display device 1, an operation of shaking the display device 1 is taken as a reset operation. Based on the output of the acceleration sensor 15, the processing unit 10 recognizes that the display device 1 is shaken. That is, the processing unit 10 can recognize that a reset operation is performed.

Figure 21:
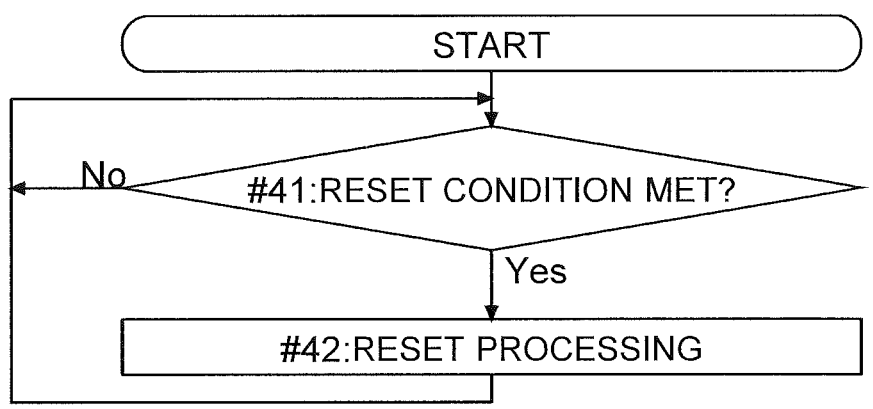
FIG. 21 is a flow chart showing one example of resetting display in the display device according to the embodiment.

The flow in FIG. 21 starts at the time point that the added image display application A1 is started up. Based on the output of the acceleration sensor 15, the processing unit 10 checks whether or not a reset condition is met (step #41). The reset condition may be that the reset operation be performed a previously determined threshold number of times or more within a previously determined threshold period. The threshold number of times may be a plurality of times. The aim is to prevent the display device 1 from being reset when it is shook slightly or accidentally. The threshold period is determined as appropriate. For example, the threshold period can be one to a plurality of seconds. For example, in a case where the threshold number of times is four and the threshold period is four seconds, when the reset operation is recognized four times or more within four seconds, the display device 1 recognizes that the reset condition is met. The reset condition may instead be that the reset operation be performed once. In this case, by shaking the display device 1 only once, it is possible to reset display.

Until the reset condition is met, the processing unit 10 performs step #41 periodically (step #41, No, then back to step #41). When the reset condition is met, the processing unit 10 performs reset processing (step #42). After step #42, the flow returns to step #41. The flow continues being executed so long as the added image display application A1 is executed. The flow ends when the added image display application A1 ends.

The reset processing is a processing for bringing all added images 4 back to the default state. Through the reset processing, the processing unit 10 has the added images 4 displayed on the display 12 displayed in the default state. Specifically, the processing unit 10 changes the size of all added images 4 back to the default size. When the reset condition is met, the processing unit 10 makes the display 12 display the added images 4 in the default size. Moreover, the processing unit 10 changes the display color of all added images 4 (character strings) back to the default color. When the reset condition is met, the processing unit 10 makes the display 12 display the added images 4 with the default degree of transparency.

Moreover, the processing unit 10 changes the degree of transparency of all added images 4 (character strings) back to the default degree of transparency. When the reset condition is met, the processing unit 10 makes the display 12 display the added images including character strings with the default degree of transparency. Moreover, the processing unit 10 erases all token images 8. When the reset condition is met, the processing unit 10 makes the display 12 display no token images 8.

(Change of Display in Responses to a Circling Operation)

Next, with reference to FIGS. 22 to 25, one example of change of display in response to a circling operation according to the embodiment. When, after a two-point touch outside the region of added images 4, a circling operation is performed, the processing unit 10 changes display. Based on the output of the touch panel 13, the processing unit 10 recognizes the two-point touch outside the region of added images 4. A two-point touch outside the region of added images 4 is a two-point touch that does not overlap any added image 4 (character string). In the display device 1, an operation involving making a two-point touch outside the region of added images 4 and then, while keeping the two-point touch, moving (circling) one of the touch positions as if using a pair of compasses is taken as a circling operation.

Based on the output of the touch panel 13, the processing unit 10 recognizes the movement of one of the touch positions of the two points. The processing unit 10 also recognizes that the movement distance of the other touch position is within a permissible range. In other words, the processing unit 10 recognizes that the other touch position hardly moves. Any other operation may be taken as the circling operation.

Based on the movement direction of one touch position, the processing unit 10 recognizes whether the circling operation is performed in a first direction or in a second direction. In the current description, the first direction is the clockwise direction. The second direction is the counter-clockwise direction. Instead, the first direction may be the counter-clockwise direction, and the second direction may be the clockwise direction. The processing unit 10 discerns in which direction the circling operation is performed.

(1) When, of the two-point touch, the lower touch position is fixed, and the upper touch position is moving:

when the upper touch position is moving rightward, the processing unit 10 recognizes a circling operation in the first direction (clockwise direction); when the upper touch position is moving leftward, the processing unit 10 recognizes a circling operation in the second direction (counter-clockwise direction)

(2) When, of the two-point touch, the upper touch position is fixed, and the lower touch position is moving:

when the lower touch position is moving leftward, the processing unit 10 recognizes a circling operation in the first direction (clockwise direction); when the lower touch position is moving rightward, the processing unit 10 recognizes a circling operation in the second direction (counter-clockwise direction)

As methods of display in response to the circling operation, three methods (a first, a second, and a third method) are available. Which method of display to use can be selected through operation on the touch panel 13. When the circling operation is performed, the processing unit 10 makes the display 12 perform display according to the selected method.

<First Method>

Figure 22:
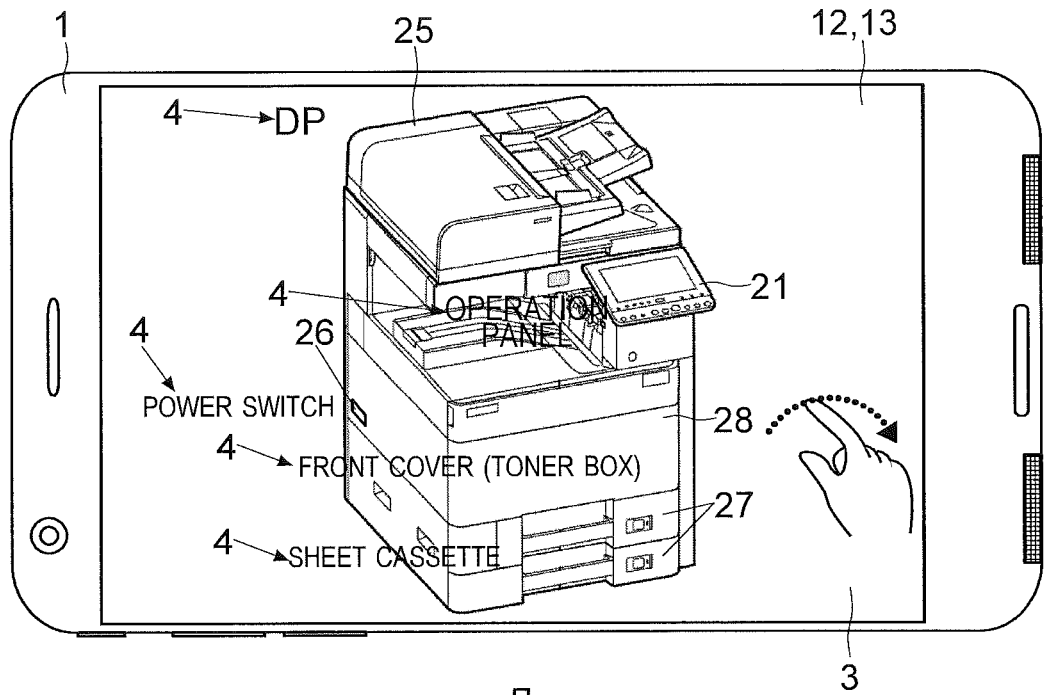
FIG. 22 is a diagram showing one example of change of display in response to a circling operation according to the embodiment.
Figure 22:
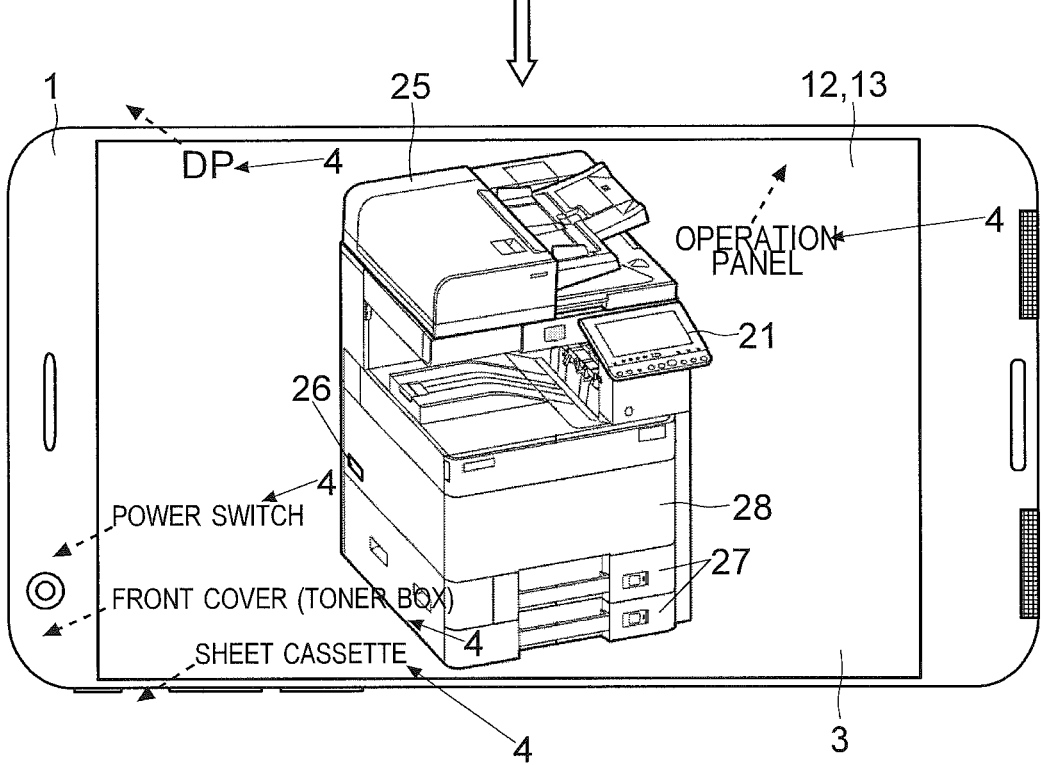
Figure 23:
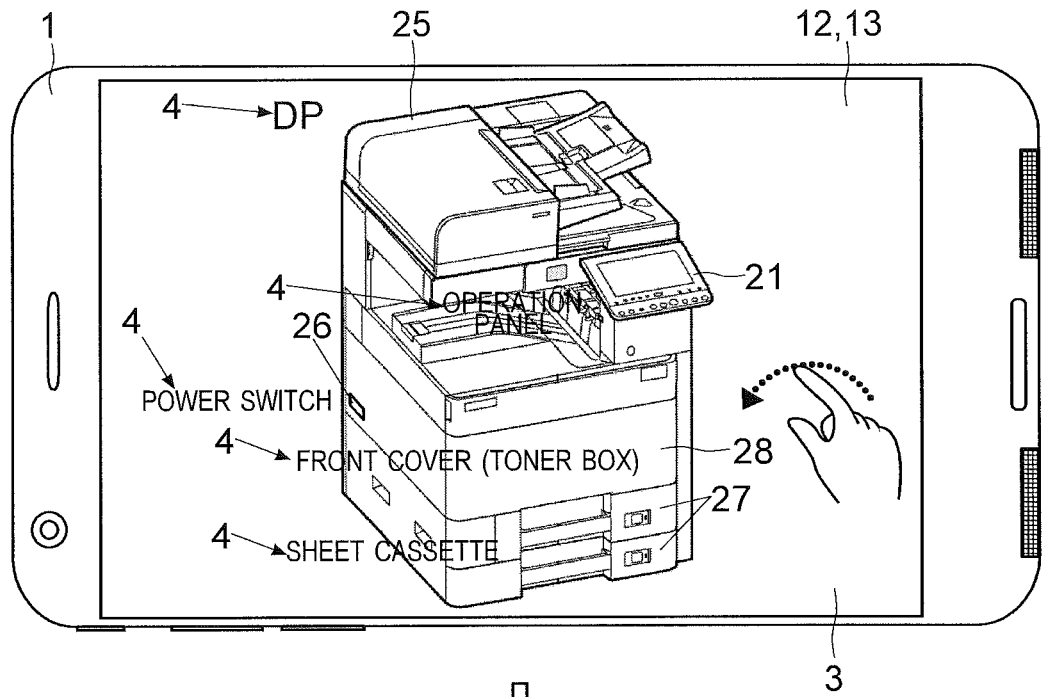
FIG. 23 is a diagram showing one example of change of display in response to a circling operation according to the embodiment.
Figure 23:
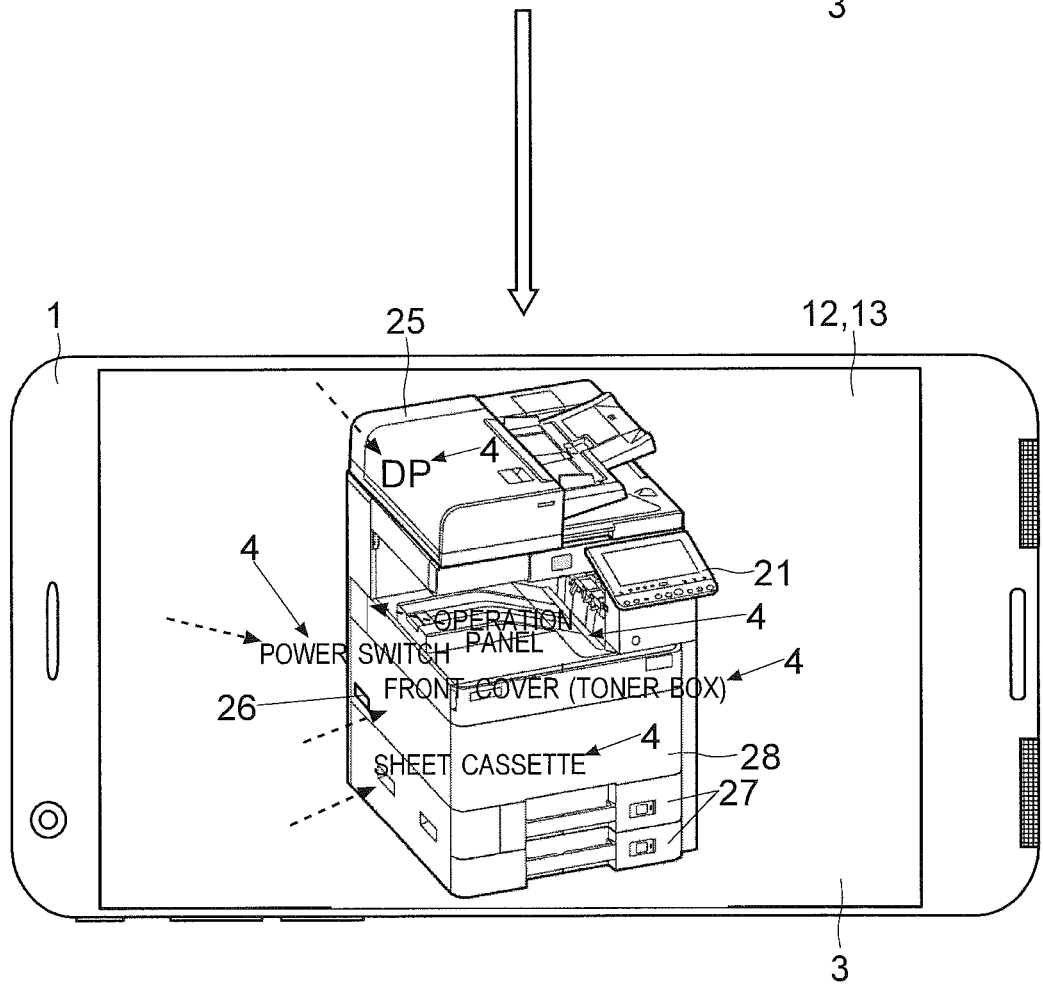

With reference to FIGS. 22 and 23, a case where the first method is selected will be described. In this case, when a circling operation involving making a two-point touch outside the region of added images 4 and then moving one touch position in the first direction is performed, the processing unit 10 moves the display positions of added images 4 in the direction away from the center of the display 12. FIG. 22 shows one example of the change of display when a circling operation in the first direction is performed while the first method is selected. The upper section of FIG. 22 shows one example of the circling operation in the first direction (clockwise direction). The upper section of FIG. 22 shows a state where a two-point touch is made with the forefinger and the thumb of the right hand. It further shows a state where, while the thumb is fixed, the forefinger is moved.

The lower section of FIG. 22 shows one example of the state after the movement of added images 4 in response to the circling operation in the first direction. One example of the movement directions of the added images 4 is indicated by broken-line arrows. As shown in the lower section of FIG. 22, the processing unit 10 moves the display positions of the added images 4 in the direction away from the center of the display 12. Thus, the added images 4 can be moved as if being flicked aside away from the center.

When a circling operation involving making a two-point touch outside the region of added images 4 and then moving one touch position in the second direction is performed, the processing unit 10 moves the display positions of the added images 4 in the direction approaching the center of the display 12. FIG. 23 shows one example of the change of display when a circling operation in the second direction is performed while the first method is selected. The upper section of FIG. 23 shows one example of the circling operation in the second direction (counter-clockwise direction). The upper section of FIG. 23 shows a state where a two-point touch is made with the forefinger and the thumb of the right hand. It further shows a state where, while the thumb is fixed, the forefinger is moved.

The lower section of FIG. 23 shows one example of the state after the movement of added images 4 in response to the circling operation in the second direction. One example of the movement directions of the added images 4 is indicated by broken-line arrows. As shown in the lower section of FIG. 23, the processing unit 10 moves the display positions of the added images 4 in the direction approaching the center of the display 12. Thus, the added images 4 can be brought closer together.

<Second Method>

Figure 24:
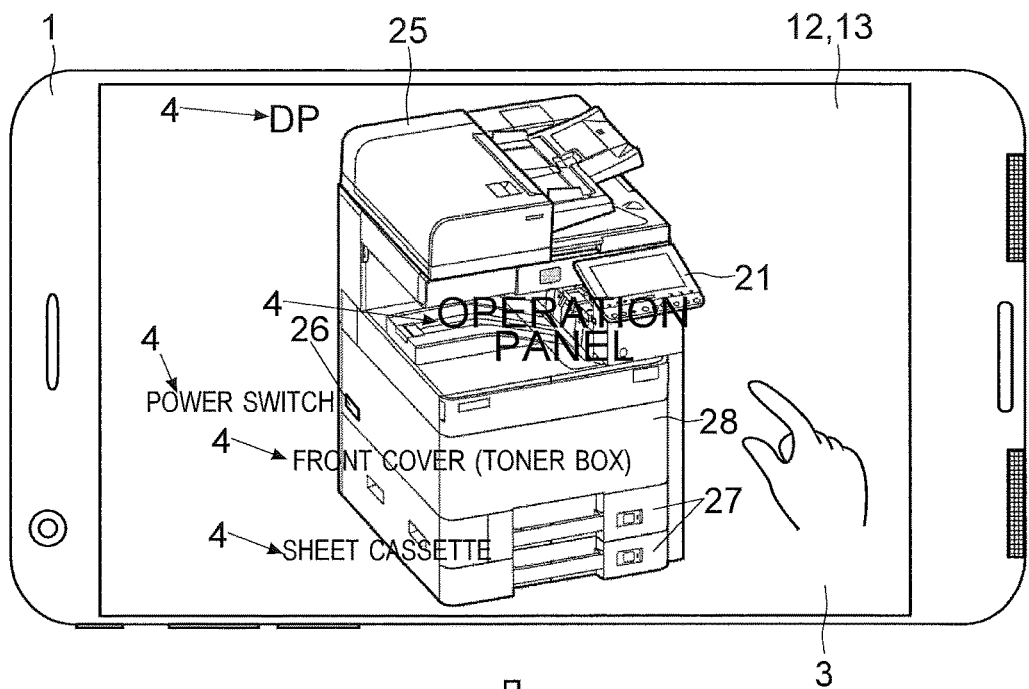
FIG. 24 is a diagram showing one example of change of display in response to a circling operation according to the embodiment.
Figure 24:
Figure 24:
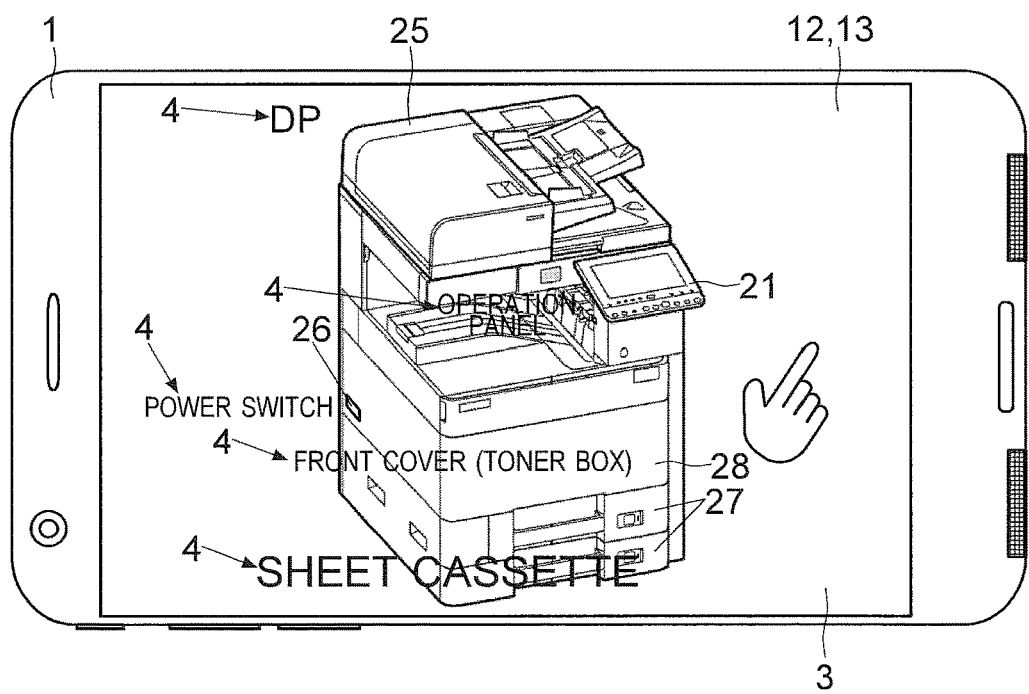

With reference to FIG. 24, the second method will be described. When the second method is selected, as a circling operation is performed, the added image 4 (character string) that is displayed on an enlarged scale is switched sequentially from one to the next. When the second method is selected, the processing unit 10 assigns numbers to the displayed added images 4 (determines their order). For example, the processing unit 10 sorts out the added images 4 included in the right half of the screen. Then, the processing unit 10 assign numbers to the sorted-out added images 4 in order from top down. Next, the processing unit 10 sorts out the added images 4 included in the left half of the screen. Then, the processing unit 10 assigns numbers to the sorted-out added images 4 in order from bottom up. In the case of the screen in FIG. 24, number one is the added image 4 for the operation panel 21, number two is the added image 4 for the sheet cassette 27, number three is the added image 4 for the front cover 28 (toner box), number four is the added image 4 for the power switch 26, and number five is the added image 4 for the DP. Numbers may be assigned in any manner other than as just described.

When a two-point touch is made outside the region of the added images 4, the processing unit 10 enlarges the added image 4 (character string) corresponding to number one. The display 12 displays the added image 4 corresponding to number one on an enlarged scale. The upper section of FIG. 24 shows one example of the display on the display 12 immediately after the two-point touch outside the region of the added images 4. In the upper section of FIG. 24, the added image 4 for the operation panel 21 corresponding to number one is enlarged.

After the two-point touch, when a circling operation involving moving one touch position in the first direction is performed, each time one touch position moves by a predetermined amount, the processing unit 10 makes the display 12 switch the added image 4 that is displayed on an enlarged scale according to the order of numbers. After the two-point touch, when a circling operation involving moving one touch position in the second direction is performed, each time one touch position moves by a predetermined amount, the processing unit 10 switches the added image 4 that is displayed on an enlarged scale in the reverse order of numbers.

The lower section of FIG. 24 shows a state where, as a result of a circling operation in the first or second direction, the added image 4 that is displayed on an enlarged scale has switched to the added image 4 including the character string of the sheet cassette 27. After a two-point touch, only by moving one finger, it is possible to switch the added image 4 that is displayed on an enlarged scale. As the touch position moves, the added image 4 that is displayed on an enlarged scale is switched as if on a roulette. When the touch panel 13 is released at both of the two points, the processing unit 10 makes the display 12 continue to display, on an enlarged scale, the added image 4 that is displayed on an enlarged scale at the time point of the release at the two point.

<Third Method>

Figure 25:
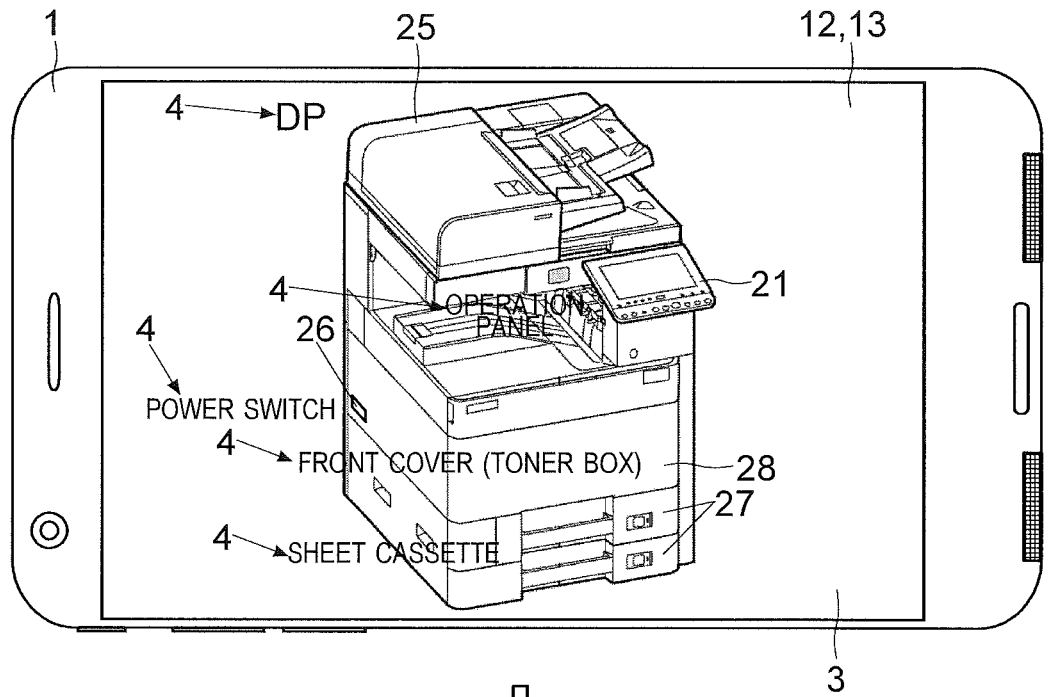
FIG. 25 is a diagram showing one example of change of display in response to a circling operation according to the embodiment.
Figure 25:
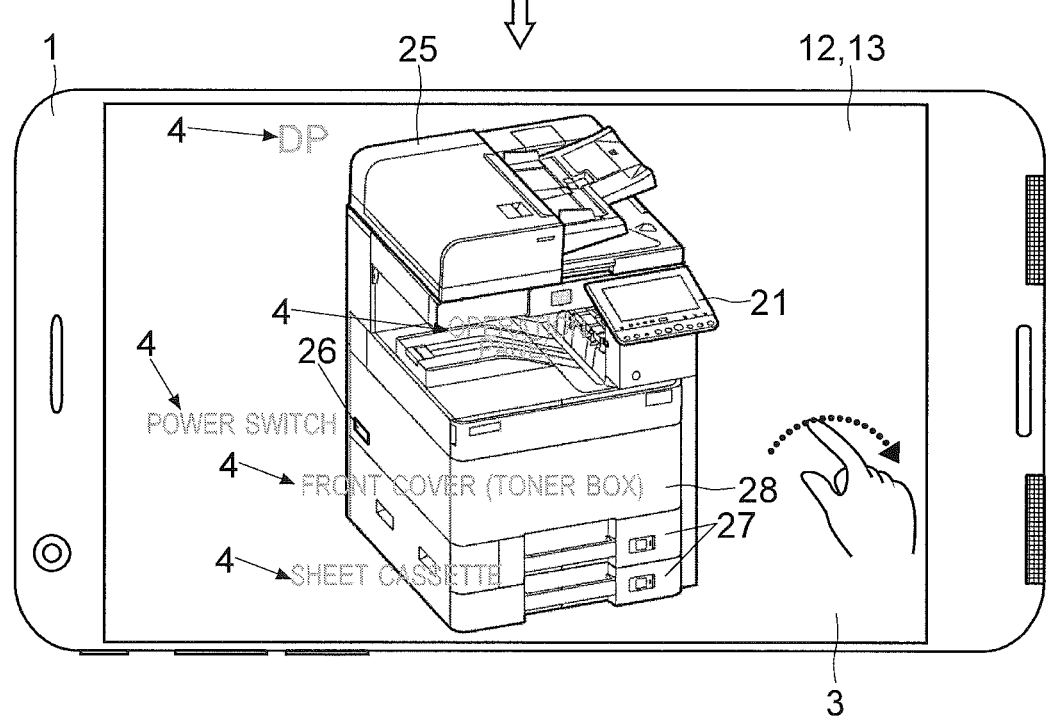

With reference to FIG. 25, the third method will be described. When the third method is selected, as a circling operation is performed, the color of added images 4 (character strings) can be switched. When the third method is selected, when a circling operation involving making a two-point touch outside the region of the added images 4 and then moving one touch position is performed, each time one touch position moves by a predetermined amount, the processing unit 10 makes the display 12 switch the color of the added images 4. In the third method, the direction of circling does not matter. The upper section of FIG. 25 shows one example of a state before the change of the color of the added images 4. The lower section of FIG. 25 shows an example of a state after the change of the color of the added images 4 in response to a circling operation.

Changeable colors are determined previously. The order of change of colors is also determined previously. For example, as the touch position is moved, the color of the characters of the added images 4 changes along a color circle. When the touch panel 13 is released at both of the two points, the processing unit 10 have the added images 4 displayed with the display color that is selected at the time point of the release at the two points. For example, when all fingers are released from the touch panel 13 when the added images 4 (character strings) are red, the processing unit 10 thereafter makes the display 12 display the added images 4 in red.

As described above, according to the embodiment, a display device 1 includes an image shooting unit 14, a display unit (display 12), an operation portion (touch panel 13), and a processing unit 10. The display unit displays a shot image 3 obtained through the shooting by the image shooting unit 14. The operation portion accepts an operations by a user. The processing unit 10 recognizes the operation based on the output of the operation portion. The processing unit 10 controls display on the display unit. The processing unit 10 recognizes a particular segment included in the shot image 3. The processing unit 10 makes the display unit display an added image 4 indicating the particular segment in a form superimposed on the shot image 3. The processing unit 10 changes the display related to the added image 4 according to the operation on the operation portion.

When an enlarging operation on the added image 4 is performed, the processing unit 10 enlarges the added image 4 on which the enlarging operation is performed as compared with before the enlarging operation. When a reducing operation on the added image 4 is performed, the processing unit 10 reduces the added image 4 on which the reducing operation is performed as compared with before the reducing operation. When enlargement causes added images 4 to overlap each other, the processing unit 10 shifts the display position of another added image 4 that overlaps an enlarged added image 4. In this way, the size of the added image 4 can be changed freely. The added image 4 can be displayed in the desired size. The added image 4 can be changed to the preferred size. A user-friendly display device 1 can be provided. A display device 1 that displays a comfortable added image 4 can be provided. Added images 4 can be prevented from overlapping and making the screen difficult to see.

The added image 4 is superimposed on top of the shot image 3. The larger the added image 4, the larger the hidden area of the shot image 3. The processing unit 10 thus makes the degree of transparency of the added image 4 higher after enlargement than before enlargement, and makes the degree of transparency of the added image 4 lower after reduction than before reduction. In this way, when the added image 4 is enlarged, the degree of transparency of the added image 4 can be made higher automatically. The enlarged added image 4 can be prevented from making the shot image 3 difficult to see.

When a transparency setting operation is performed, the processing unit 10 have the added image 4 on which the transparency setting operation is performed displayed with the degree of transparency set by the transparency setting operation. In this way, the degree of transparency of the added image 4 can be set. The added image 4 can be displayed with the desired degree of transparency. The degree of transparency of the added image 4 can be changed to the preferred value. A user-friendly display device 1 can be provided. A display device 1 that displays a comfortable added image 4 can be provided.

When a rubbing operation of rubbing the added image 4 is performed, the processing unit makes the degree of transparency of the added image 4 on which the rubbing operation is performed higher and, when a previously determined recovery time has elapsed since the rubbing operation was performed, the processing unit 10 turns the degree of transparency of the added image 4 on which the rubbing operation was performed back to the degree of transparency before the rubbing operation. In this way, the degree of transparency of the added image 4 can be made higher temporarily. The user has simply to perform the rubbing operation. Simply by rubbing, the hot image 3 beneath the added image 4 can be confirmed. Moreover, the degree of transparency recovers automatically, and thus no operation to restore the degree of transparency has to be performed.

When an operation to select a color is performed, the processing unit 10 makes the display unit display the added image 4 using the selected color. In this way, the color of the added image 4 can be set. The added image 4 can be displayed in the desired color. The added image 4 can be changed to the preferred color. A user-friendly display device 1 can be provided. A comfortable display device 1 can be provided.

When an operation to change the color of all added images 4 is performed, the processing unit 10 changes all the added images 4 to the selected color. When an operation to change the color of one added images 4 is performed, the processing unit 10 changes the selected added image 4 to the selected color. In this way, the color of all added images 4 can be changed at once. The color of only part of the added images 4 can also be changed.

The image forming apparatus 2 includes a reset detection unit (acceleration sensor 15) which detects a reset operation which is an operation of shaking the display device 1. The processing unit 10 recognizes that the reset operation is performed based on the output of the reset detection unit. When the reset operation is performed, the processing unit 10 performs reset processing to bring one or more of the size, the display color, and the degree of transparency of the added image 4 back to the default setting. The reset operation is an operation of shaking the display device 1. In this way, simply by shaking the display device 1, display can be reset.

When a previously determined reset condition is met, the processing unit 10 performs the reset operation. When the previously determined reset condition is not met, the processing unit 10 does not perform the reset operation. The reset condition is that the reset operation is performed a previously determined threshold number of times or more within a previously determined threshold period. In this way, unintended resetting can be prevented.

The processing unit 10 may judge whether or not to perform resetting based on the width of a shake of the display device 1 (the displacement of a shaking gesture). For example, the reset condition may be that the display device 1 is shook widely. In this case, the processing unit 10 monitors the output of the acceleration sensor 15. When the display device 1 is shook widely, the display device 1 is moved (shook) for a long time. Moreover, when the display device 1 is shook widely, the display device 1 is shook with a certain degree of vigor. Accordingly, when the acceleration sensor 15 senses a predetermined magnitude of acceleration or larger for a previously determined duration or longer continuously, the processing unit 10 recognizes that the display device 1 is shook widely. In this case, the processing unit 10 may recognize that the reset condition is met.

The operation portion is a touch panel 13. When a circling operation involving making a two-point touch and then moving one touch position in a previously determined first direction is performed, the processing unit 10 may move the display position of the added image 4 in the direction away from the center of the display unit. When a circling operation involving making a two-point touch and then moving one touch position in a second direction opposite to the first direction is performed, the processing unit 10 may move the display position of the added image 4 in the direction approaching the center of the display unit. In this way, the display position of the added image 4 can be shifted easily. By the first circling operation, the display position of the added image 4 can be shifted to come closer to the edge of the screen. By the second circling operation, the display position of the added image 4 can be shifted to come closer to the center of the screen.

The processing unit 10 assigns numbers to displayed added images 4 respectively. When a circling operation involving making a two-point touch and then moving one touch position in a previously determined first direction is performed, each time the touch position moves a predetermined amount, the processing unit 10 may make the display 12 switch the added image 4 displayed on an enlarged scale according to the order of the numbers. When a circling operation involving making a two-point touch and then moving one touch position in a second direction opposite to the first direction is performed, each time the touch position moves a predetermined amount, the processing unit 10 may switch the added image 4 displayed on an enlarged scale in the reverse order of the numbers. When the touch panel 13 is released at both of the two points, the processing unit 10 may make the display unit continue to display on an enlarged scale the added image 4 which is displayed on an enlarged scale at the time point of the release at the two points. In this way, simply by performing a circling operation, the added image 4 that is displayed on an enlarged scale can be switched easily. The added image 4 that is displayed on an enlarged scale can be selected easily.

When a circling operation involving making a two-point touch and then moving one touch position is performed, the processing unit 10 may have the display color of the added image 4 switched according to the movement amount of the touch position. When the touch panel 13 is released at both of the two points, the processing unit 10 may have the added image 4 displayed in the display color at the time point of the release at the two points. In this way, the color of the added image 4 can be changed easily.

The processing unit 10 makes the display unit display an added image 4 indicating a particular segment in a form superimposed on the shot image 3. When a pinning-on operation on the added image 4 is performed, the processing unit 10 has a token image 8 indicating a pin start to be displayed in a form superimposed on a pinned-on added image 41 which is the added image 4 on which the pinning-on operation is performed. Even when the particular segment corresponding to the pinned-on added image 41 is not included in the shot image 3, the processing unit 10 has the token image 8 displayed at the same position as the display start position of the token image 8, and makes the display unit display the pinned-on added image 41 corresponding to the token image 8.

In this way, the added image 4 on which the pinning-on operation is performed (the pinned-on added image 41) is displayed as if pinned-on. The added image 4 to which the user is paying attention can be marked with a token. The token image 8 continues to be displayed at the same position. Thus, the token for the added image 4 to which attention is being paid can be kept being displayed. Moreover, even when the particular segment corresponding to the pinned-on added image 41 is not included in the shot image 3, the token image 8 and the pinned-on added image 41 can be displayed.

When the particular segment corresponding to the pinned-on added image 41 ceases to be included in the shot image 3, the processing unit 10 makes the display unit erase the pinned-on added image 41. When the token image 8 is operated in a state where the particular segment corresponding to the pinned-on added image 41 is not included in the shot image 3, the processing unit 10 makes the display unit display the pinned-on added image 41 corresponding to the token image 8 temporarily. In this way, when the particular segment corresponding to the pinned-on added image 41 is not included in the shot image 3, only when the user wishes, the pinned-on added image 41 can be displayed. The pinned-on added image 41 that is displayed temporarily disappears before long. Thus, the pinned-on added image 41 is prevented from making the shot image 3 difficult to see.

When the particular segment corresponding to the pinned-on added image 41 is not included in the shot image 3, the processing unit 10 makes the display unit display a direction indicating image 9 indicating the direction of the particular segment. In this way, the direction of the particular segment corresponding to the pinned-on added image 41 can be indicated to the user. The position of the particular segment corresponding to the pinned-on added image 41 can be indicated to the user.

The display device 1 includes a reset detection unit which detects a reset operation which is an operation of shaking the display device 1. The processing unit 10 recognizes that the reset operation is performed based on the output of the reset detection unit. When the reset operation is performed, the processing unit 10 makes the display unit erase the token image 8. In this way, simply by shaking the display device 1, display can be reset.

When an erasing operation on the token image 8 is performed, the processing unit 10 makes the display unit erase the token image 8 on which the erasing operation is performed. The pinned-on added image 41 can be turned back to the ordinary added image 4.

The erasing operation is an operation involving performing an operation as if pinching the token image 8 and then removing the fingers from the touch panel 13. In this way, an operation as if pulling off the pin can be taken as the erasing operation. The erasing operation can be made an intuitive, easy-to-grasp operation.

When the pinning-on operation is performed, the processing unit 10 makes the display unit display a first token image 81 as the token image 8. When a sticking-in operation to stick in the first token image 81 is performed, the processing unit 10 makes the display unit display a second token image 82 in place of the first token image 81. The second token image 82 differs from the first token image 81 in one or more of shape, size, and color. In this way, a token image 8 that reflects the degree of sticking-in of the pin can be displayed. For example, the user performs the sticking-in operation for a token image 8 (added image 4) which the user believes has a high degree of importance. The second token image 82 indicates a pin that is stuck in more firmly than the first token image 81. According to the degree of importance of the added image 4, the kind of the token image 8 can be varied. In other words, a token image 8 that reflects the degree of importance of the added image 4 can be displayed.

When a first display period has elapsed since the pinning-on operation was performed, the processing unit 10 makes the display unit erase the first token image 81. When a second display period has elapsed since the pinning-on operation was performed, the processing unit 10 makes the display unit erase the second token image 82. The first display period is shorter than the second display period. In this way, the period for which the second token image 82 is displayed can be made longer than the period for which the first token image 81 is displayed.

The display device 1 includes a location sensing unit (GPS signal processing unit 16) which senses the location. The processing unit 10 recognizes the distance between the location where the pinning-on operation was performed and the current location based on the output of a location sensing unit. When the distance between the location where the pinning-on operation was performed and the current location becomes equal to or more than a first erasure distance, the processing unit 10 makes the display unit erase the first token image 81. When the distance between the location where the pinning-on operation was performed and the current location becomes equal to or more than a second erasure distance, the processing unit 10 makes the display unit erase the second token image 82. The first erasure distance is shorter than the second erasure distance. In this way, the second token image 82 can be made to be erased less soon than the first token image 81.

While an embodiment of the present disclosure is described above, it is in no way meant to limit the scope of the present disclosure, the present disclosure can be implemented with any modifications made within the spirit of the present disclosure.

What is claimed is:

1. A display device comprising:
a camera;
a display which displays a shot image obtained through shooting by the camera;
an operation portion which accepts an operation by a user; and
a processing unit which includes an image processing circuit,
recognizes the operation based on an output of the operation portion, controls display on the display,
recognizes, within the shot image, a particular segment, which is a previously determined part of an image forming apparatus, based on a marker with which the particular segment is marked or based on analysis of the shot image,
makes the display, near the particular segment included in the shot image, an added image including a character indicating the particular segment,
when an enlarging operation on the added image is performed, enlarges the added image on which the enlarging operation is performed as compared with before the enlarging operation,
when a reducing operation on the added image is performed, reduces the added image on which the reducing operation is performed as compared with before the reducing operation, and wherein performing the enlargement operation on the added image causes an enlarged added image and the added image that the display displays to overlap each other, and shifts a display position of another added image that overlaps the enlarged added image.

2. The display device according to claim 1, wherein the processing unit
makes a degree of transparency of the added image higher after enlargement than before enlargement and
makes the degree of transparency of the added image lower after reduction than before reduction.

3. The display device according to claim 1, wherein
when a transparency setting operation is performed, the processing unit have the added image on which the transparency setting operation is performed displayed with a degree of transparency set by the transparency setting operation.

4. The display device according to claim 1, wherein
when a rubbing operation of rubbing the added image is performed, the processing unit makes a degree of transparency of the added image on which the rubbing operation is performed higher and
when a previously determined recovery time has elapsed since the rubbing operation was performed, the processing unit turns the degree of transparency of the added image on which the rubbing operation was performed back to the degree of transparency before the rubbing operation.

5. The display device according to claim 1, wherein
when an operation to change a color of the added image and other added images is performed, the processing unit changes all the added images to a selected color, and
when an operation to change a color of one added image is performed, the processing unit changes the selected added image to a selected color.

6. The display device according to claim 1, wherein
the processing unit assigns numbers to displayed added images respectively,
the operation portion is a touch panel,
when a circling operation involving making a two-point touch and then moving one touch position in a previously determined first direction is performed, with respect to the one touch position, each time the touch position is moved a predetermined amount, the processing unit increases a size of the added image in an order of the numbers,
when a circling operation involving making a two-point touch and then moving one touch position in a second direction opposite to the first direction is performed, with respect to the one touch position, each time the touch position is moved a predetermined amount, the processing unit increases the size of the added image in a reverse order of the numbers, and
when the touch panel is released at both of two points, the processing unit makes the display continue to display on an enlarged scale the added image that is displayed on an enlarged scale at a time point of release at the two points.

7. The display device according to claim 1, wherein
the operation portion is a touch panel,
when a circling operation involving making a two-point touch and then moving one touch position is performed, the processing unit has a display color of the added image switched according to a movement amount of the touch position, and
when the touch panel is released at both of two points, the processing unit has the added image displayed in a display color at a time point of release at the two points.

8. The display device according to claim 1, wherein
when a pinning-on operation on the added image is performed, the processing unit has a token image indicating a pin start to be displayed in a form superimposed on a pinned-on added image which is the added image on which the pinning-on operation is performed, and
even when the particular segment corresponding to the pinned-on added image is not included in the shot image, the processing unit has the token image displayed at a same position as a display start position of the token image, and makes the display unit display the pinned-on added image corresponding to the token image.

9. The display device according to claim 8, wherein
when the particular segment corresponding to the pinned-on added image ceases to be included in the shot image, the processing unit makes the display unit erase the pinned-on added image, and
when the token image is operated in a state where the particular segment corresponding to the pinned-on added image is not included in the shot image, the processing unit makes the display unit display the pinned-on added image corresponding to the token image temporarily.

10. The display device according to claim 8, wherein
when the particular segment corresponding to the pinned-on added image is not included in the shot image, the processing unit makes the display unit display a direction indicating image indicating a direction of the particular segment.

11. The display device according to claim 10, further comprising:
a reset detection unit which detects a reset operation which is an operation of shaking the display device, wherein
the processing unit recognizes that the reset operation is performed based on an output of the reset detection unit, and
when the reset operation is performed, the processing unit makes the display unit erase the token image.

12. The display device according to claim 8, wherein
when an erasing operation on the token image is performed, the processing unit makes the display unit erase the token image on which the erasing operation is performed.

13. The display device according to claim 12, wherein
the operation portion is a touch panel, and
the erasing operation is an operation involving performing an operation as if pinching the token image and then removing fingers from the touch panel.

14. The display device according to claim 8, wherein
when the pinning-on operation is performed, the processing unit makes the display unit display a first token image as the token image,
when a sticking-in operation to stick in the first token image is performed, the processing unit makes the display unit display a second token image in place of the first token image, and
the second token image differs from the first token image in one or more of shape, size, and color.

15. The display device according to claim 14, wherein
when a first display period has elapsed since the pinning-on operation was performed, the processing unit makes the display unit erase the first token image, when a second display period has elapsed since the pinning-on operation was performed, the processing unit makes the display unit erase the second token image, and the first display period is shorter than the second display period.

16. The display device according to claim 14, further comprising:

a location sensing unit which senses a location, wherein the processing unit recognizes a distance between a location where the pinning-on operation was performed and a current location based on an output of the location sensing unit, when the distance between the location where the pinning-on operation was performed and the current location becomes equal to or more than a first erasure distance, the processing unit makes the display unit erase the first token image, when the distance between the location where the pinning-on operation was performed and the current location becomes equal to or more than a second erasure distance, the processing unit makes the display unit erase the second token image.

17. A display device comprising:

a camera;

a display which displays a shot image obtained through shooting by the camera;

an operation portion which accepts an operation by a user;

an acceleration sensor which senses a reset operation, which is an operation of shaking the display device; and a processing unit which includes an image processing circuit, recognizes the operation based on an output of the operation portion, controls display on the display, recognizes, within the shot image, a particular segment, which is a previously determined part of an image forming apparatus, based on a marker with which the particular segment is marked or based on analysis of the shot image, makes the display an added image including a character indicating the particular segment near the particular segment included in the shot image, recognizes that a reset operation is performed based on an output of the acceleration sensor, and when the reset operation is performed, performs reset processing to bring one or more of a size, a display color, and a degree of transparency of the added image back to a default setting.

18. The display device according to claim 17, wherein when a previously determined reset condition is met, the processing unit performs the reset operation, when the previously determined reset condition is not met, the processing unit does not perform the reset operation, and the reset condition is that the reset operation is performed a previously determined threshold number of times or more within a previously determined threshold period.

19. A display device comprising:

a camera;

a display which displays a shot image obtained through shooting by the camera;

an operation portion which accepts an operation by a user; and a processing unit which includes an image processing circuit recognizes the operation based on an output of the operation portion, controls display on the display, recognizes, within the shot image, a particular segment, which is a previously determined part of an image forming apparatus, based on a marker with which the particular segment is marked or based on analysis of the shot image, makes the display an added image including a character indicating the particular segment near the particular segment included in the shot image, wherein the operation portion is a touch panel, when a circling operation involving making a two-point touch and then moving one touch position in a previously determined first direction is performed, the processing unit moves a display position of the added image in a direction away from a center of the display, and when a circling operation involving making a two-point touch and then moving one touch position in a second direction opposite to the first direction is performed, the processing unit moves the display position of the added image in a direction approaching the center of the display.

* * * * *